US012163075B2

United States Patent
Kido et al.

(10) Patent No.: US 12,163,075 B2
(45) Date of Patent: Dec. 10, 2024

(54) SEMICONDUCTOR NANOPARTICLE COMPLEX

(71) Applicant: SHOEI CHEMICAL INC., Tokyo (JP)

(72) Inventors: Makoto Kido, Tosu (JP); Takafumi Moriyama, Tosu (JP); Hirokazu Sasaki, Tosu (JP); Yuko Mitsuka, Tosu (JP)

(73) Assignee: SHOEI CHEMICAL INC., Tokyo (JP)

( * ) Notice: Subject to any disclaimer, the term of this patent is extended or adjusted under 35 U.S.C. 154(b) by 491 days.

(21) Appl. No.: 17/595,924

(22) PCT Filed: May 29, 2020

(86) PCT No.: PCT/JP2020/021467
§ 371 (c)(1),
(2) Date: Nov. 29, 2021

(87) PCT Pub. No.: WO2020/241875
PCT Pub. Date: Dec. 3, 2020

(65) Prior Publication Data
US 2022/0325174 A1 Oct. 13, 2022

(30) Foreign Application Priority Data

May 31, 2019 (JP) .................................. 2019-103247

(51) Int. Cl.
| C09K 11/62 | (2006.01) |
| B82Y 20/00 | (2011.01) |
| B82Y 30/00 | (2011.01) |
| B82Y 40/00 | (2011.01) |
| C09K 11/02 | (2006.01) |
| C09K 11/54 | (2006.01) |
| C09K 11/70 | (2006.01) |

(52) U.S. Cl.
CPC ............ *C09K 11/62* (2013.01); *C09K 11/025* (2013.01); *C09K 11/54* (2013.01); *C09K 11/70* (2013.01); *B82Y 20/00* (2013.01); *B82Y 30/00* (2013.01); *B82Y 40/00* (2013.01)

(58) Field of Classification Search
CPC ....... C09K 11/025; C09K 11/62; C09K 11/54; C09K 11/70
See application file for complete search history.

(56) References Cited

U.S. PATENT DOCUMENTS

| 2018/0010042 A1* | 1/2018 | Miyanaga ............. H01L 33/502 |
| 2019/0115507 A1* | 4/2019 | Kim ...................... H10K 50/125 |
| 2019/0276734 A1* | 9/2019 | Kim ...................... H10K 59/12 |

FOREIGN PATENT DOCUMENTS

| JP | 2013136498 A | | 7/2013 |
| JP | 2017533875 A | | 11/2017 |
| JP | 2019073705 A | | 5/2019 |
| KR | 2018-0094805 | * | 8/2018 |
| WO | 2015156226 A1 | | 10/2015 |
| WO | 2017038487 A1 | | 3/2017 |
| WO | 2017086362 A1 | | 5/2017 |
| WO | 2017201386 A1 | | 11/2017 |

OTHER PUBLICATIONS

Dubois, F et al., "A Versatile Strategy for Quantum Dot Ligand Exchange," Journal of the American Chemical Society, vol. 129, No. 3. Dec. 23, 2006, 2 pages.
Jin, T., "Semiconductor quantum dots: their synthesis and application to bioscience," Production and Technology, vol. 63, No. 2, 2011, 13 pages (submitted with machine translation).
Pong, B. et al., "Modified Ligand-Exchange for Efficient Solubilization of CdSe/ZnS Quantum Dots in Water: a Procedure Guided by Computational Studies," Langmuir, vol. 24, Apr. 16, 2008, 7 pages.
Rahman, S. et al., "Thiolate-Capped CdSe/ZnS Core-Shell Quantum Dots for the Sensitive Detection of Glucose," Sensors, vol. 17, No. 7, Jul. 1, 2017, 12 pages.
Wenger, W. et al., "Functionalization of Cadmium Selenide Quantum Dots with Poly(ethylene glycol): Ligand Exchange, Surface Coverage, and Dispersion Stability," Langmuir, vol. 33, No. 33, Aug. 2, 2017, 7 pages.
Singh J. et al., "Encapsulation of Zinc Oxide Nanorods and Nanoparticles," Langmuir, vol. 25, No. 17, Aug. 5, 2009, 7 pages.

* cited by examiner

*Primary Examiner* — C Melissa Koslow
(74) *Attorney, Agent, or Firm* — Alleman Hall & Tuttle LLP

(57) ABSTRACT

A semiconductor nanoparticle complex in which two or more ligands including an aliphatic ligand and a polar ligand are coordinated to a surface of a semiconductor nanoparticle, wherein: the ligands are composed of an organic group and a coordinating group; in the aliphatic ligand, the organic group is an aliphatic hydrocarbon group; the polar ligand includes a hydrophilic functional group in the organic group; a mass ratio of the aliphatic ligand to the polar ligand (aliphatic ligand/polar ligand) is 0.05 to 1.00; a ratio ($\{(X_H)/L\} \times 100$) of a mass reduction rate of the semiconductor nanoparticle complex in a range of 350° C. or higher and 550° C. or lower in a thermogravimetric analysis ($X_H$) to a mass fraction of all ligands in the semiconductor nanoparticle complex at room temperature (L) is 10 or more and 55 or less.

18 Claims, 8 Drawing Sheets

SEMICONDUCTOR NANOPARTICLE COMPLEX

TECHNICAL FIELD

The present invention relates to a semiconductor nanoparticle complex.

This application claims priority based on Japanese Patent Application No. 2019-103247 filed on May 31, 2019, and the contents described in the Japanese patent applications are incorporated herein in the entirety.

BACKGROUND ART

Semiconductor nanoparticles that are so small that a quantum confinement effect is exhibited have a bandgap that depends on the particle diameter. Excitons formed in semiconductor nanoparticles by means of photoexcitation, charge injection, and the like, emit photons with energy corresponding to the band gap by recombination, hence, light emission at a desired wavelength can be obtained by appropriately selecting the composition of the semiconductor nanoparticles and particle diameter thereof.

At the early stage of the research, semiconductor nanoparticles were mainly studied for elements including Cd and Pb, but since Cd and Pb are substances subject to regulation by the Restriction of the Use of Certain Hazardous Substances, in recent years, research on non-Pb-based and non-Cd-based semiconductor nanoparticles has been carried out.

Attempts have been made to use semiconductor nanoparticles in a variety of applications such as display applications, biomarking applications, and solar cell applications. In particular, in display applications, the use of semiconductor nanoparticles formed into a membrane as a wavelength conversion layer has begun.

CITATION LIST

Patent Literature

[PTL 1] International Patent Publication No. WO2015/156226.
[PTL 2] Japanese Patent Application Publication No. 2013-136498.

Non Patent Literature

[NPL 1] Takashi Kami, "Semiconductor quantum dots: their synthesis and application to bioscience", Production and Technology, Vol. 63, No. 2, p. 58-63, 2011.
[NPL 2] Fabien Dubois et al., "A Versatile Strategy for Quantum Dot Ligand Exchange" J. AM. CHEM. SOC Vol. 129, No. 3, p. 482-483, 2007.
[NPL 3] Boon-Kin Pong et al., "Modified Ligand-Exchange for Efficient Solubilization of CdSe/ZnS Quantum Dots in Water: A Procedure Guided by Computational Studies" Langmuir Vol. 24, No. 10, p. 5270-5276, 2008.
[NPL 4] Samsulida Abd. Rahman et al, "Thiolate-Capped CdSe/ZnS Core-Shell Quantum Dots for the Sensitive Detection of Glucose" Sensors Vol. 17, No. 7, p. 1537, 2017.
[NPL 5] Whitney Nowak Wenger et al, "Functionalization of Cadmium Selenide Quantum Dots with Poly(ethylene glycol): Ligand Exchange, Surface Coverage, and Dispersion Stability" Langmuir, Vol. 33, No. 33, pp. 8239-8245, 2017.
[NPL 6] Jagdeep Singh et al., "Encapsulation of Zinc Oxide Nanorods and Nanoparticles" Langmuir, vol. 25, No. 17, pp 9947-9953, 2009.

SUMMARY OF INVENTION

Technical Problem

Semiconductor nanoparticles and semiconductor nanoparticle complexes can generally be dispersed in a dispersion medium and prepared as a dispersion liquid to be used in various fields. In particular, in order to add practicality thereto, dispersing in a dispersion medium is necessary.

Further, depending on application, the semiconductor nanoparticles and the semiconductor nanoparticle complexes may be exposed to a high temperature of about 200° C. in the presence of oxygen in a process including a step of forming a film including semiconductor nanoparticles, a step of baking a photoresist including semiconductor nanoparticles, a step of removing a solvent and curing a resin after inkjet patterning of semiconductor nanoparticles, and the like. At that time, a ligand having a weak force of binding to the semiconductor nanoparticle is likely to be detached from the surface of the semiconductor nanoparticle at a lower temperature. When the ligand is detached from the surface of the semiconductor nanoparticle, the surface of the semiconductor nanoparticles is oxidized, which results in a decrease in fluorescence quantum yield.

Patent Literature 1 discloses the detachment of ligands of semiconductor nanoparticle complexes that can be dispersed in a non-polar solvent. The detachment of ligands is within 70% when the temperature is raised from 350° C. to 490° C. However, although the semiconductor nanoparticle complexes described in Patent Literature 1 can be dispersed in a non-polar solvent, the complexes cannot be dispersed in a polar solvent. When dispersing in a polar solvent, it is necessary to change the ligand coordinating to the semiconductor nanoparticle to form a semiconductor nanoparticle complex dispersible in the polar solvent. Further, the ligand of the semiconductor nanoparticle complex dispersed in a polar solvent needs to have a high detachment temperature.

Non-Patent Literature 1 to 5 and Patent Literature 2 disclose that the dispersion medium enabling dispersion can be changed by exchanging the ligand coordinating to the surface of the semiconductor nanoparticle with a different ligand. However, although these semiconductor nanoparticle complexes can be dispersed in a polar solvent, an inherent problem arises in that the fluorescence quantum yield of the semiconductor nanoparticle complex is lowered by ligand exchange.

Therefore, an object of the present invention is to provide a semiconductor nanoparticle complex that can be dispersed in a polar dispersion medium and has a high ligand detachment temperature.

Solution to Problem

The semiconductor nanoparticle complex according to an embodiment of the present invention is a semiconductor nanoparticle complex in which two or more ligands including an aliphatic ligand and a polar ligand are coordinated to a surface of a semiconductor nanoparticle, wherein the ligands are composed of an organic group and a coordinating group;

in the aliphatic ligand, the organic group is an aliphatic hydrocarbon group;

the polar ligand includes a hydrophilic functional group in the organic group;

a mass ratio of the aliphatic ligand to the polar ligand (aliphatic ligand/polar ligand) is 0.05 to 1.00;

a ratio ($\{(X_H)/L\} \times 100$) of a mass reduction rate of the semiconductor nanoparticle complex in a range of 350° C. or higher and 550° C. or lower in a thermogravimetric analysis ($X_H$) to a mass fraction of all ligands in the semiconductor nanoparticle complex at room temperature (L) is 10 or more and 55 or less.

Further, the semiconductor nanoparticle complex according to another embodiment of the present invention is a semiconductor nanoparticle complex in which two or more ligands including an aliphatic ligand and a polar ligand are coordinated to a surface of a semiconductor nanoparticle, wherein the ligands are composed of an organic group and a coordinating group;

in the aliphatic ligand, the organic group is an aliphatic hydrocarbon group;

the polar ligand includes a hydrophilic functional group in the organic group;

a mass ratio of the aliphatic ligand to the polar ligand (aliphatic ligand/polar ligand) is 0.05 to 1.00;

a mass reduction rate ($X_H$) of the semiconductor nanoparticle complex in a range of 350° C. or higher and 550° C. or lower in a thermogravimetric analysis is 2% or more and 15% or less.

In the present application, the range indicated by preposition "to" includes the numbers indicated at both ends thereof.

Further, in the present application, "room temperature" means 25° C.

Advantageous Effects of Invention

According to the abovementioned invention, it is possible to provide a semiconductor nanoparticle complex that can be dispersed in a polar dispersion medium and has a high ligand detachment temperature.

DESCRIPTION OF EMBODIMENTS

Figure 1:
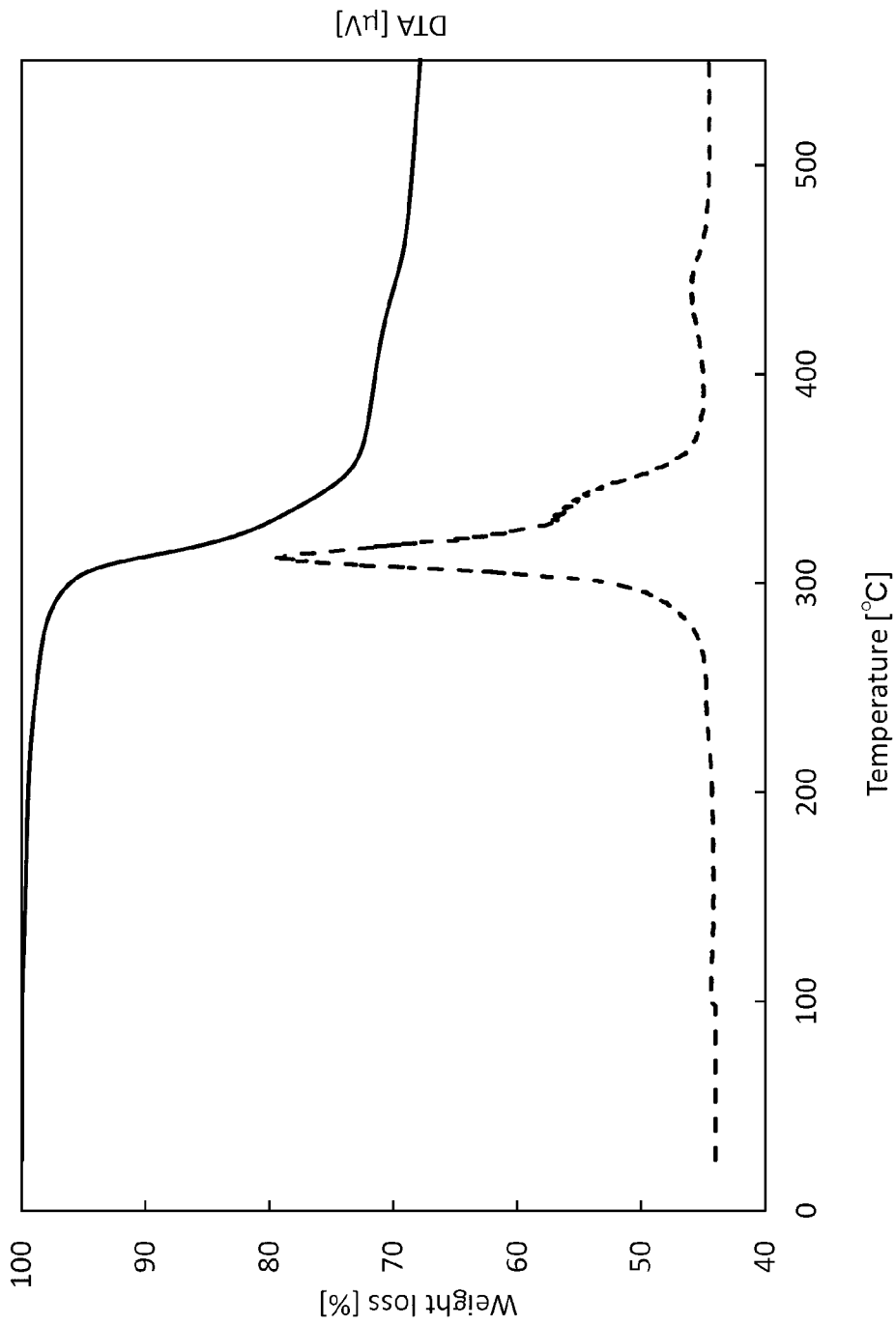
FIG. 1 shows the results of thermogravimetric analysis of a semiconductor nanoparticle complex according to an embodiment of the present invention.

The present invention relates to a semiconductor nanoparticle complex.

<Semiconductor Nanoparticles>

In the present invention, the semiconductor nanoparticle complex is a semiconductor having light emission characteristics. The semiconductor nanoparticle complex of the present invention is a particle that absorbs light of 340 nm to 480 nm and emits light having an emission peak wavelength of 400 nm to 750 nm.

The full width at half maximum (FWHM) of the emission spectrum of the semiconductor nanoparticle complex is preferably 40 nm or less, and more preferably 38 nm or less. When the full width at half maximum of the emission spectrum is within the above range, color mixing can be reduced when the semiconductor nanoparticle complex is applied to a display or the like.

The fluorescence quantum yield (QY) of the semiconductor nanoparticle complex is preferably 80% or more, and more preferably 85% or more. When the fluorescence quantum yield of the semiconductor nanoparticle complex is 80% or more, color conversion can be performed more efficiently. In the present invention, the fluorescence quantum yield of the semiconductor nanoparticle complex can be measured using a quantum yield measurement system.

—Semiconductor Nanoparticle—

A semiconductor nanoparticle constituting the semiconductor nanoparticle complex is not particularly limited as long as the above-mentioned fluorescence quantum yield and light emission characteristics such as full width at half maximum are satisfied, and may be a particle made of one type of semiconductor or a particle composed of two or more different semiconductors. In the case of particles composed of two or more different types of semiconductors, a core-shell structure may be composed of these semiconductors.

The type of semiconductor is not particularly limited, and examples thereof include InP, GaP, CdSe, CdS, ZnS, ZnSe, ZnS, and the like. In particular, a Cd-free semiconductor is preferable. Here, the semiconductor nanoparticle may include a composition other than the semiconductor as long as the characteristics of the semiconductor nanoparticles are not impaired.

In the case of a particle including two or more different semiconductors, a mixture of the above-mentioned semiconductors may be used. When forming a core-shell structure, a core-shell type particle may have a core including a Group III element and a Group V element and a shell including a Group II element and a Group VI element covering at least a part of the core. Here, the shell may have a plurality of shells having different compositions, or may have one or more gradient-type shells in which the ratio of the elements constituting the shell changes in the shell.

Specific examples of Group III elements include In, Al and Ga.

Specific examples of Group V elements include P, N and As.

The composition for forming the core is not particularly limited, but InP is preferable from the viewpoint of light emission characteristics.

The Group II element is not particularly limited, and examples thereof include Zn and Mg.

Examples of Group VI elements include S, Se, Te and O.

The composition for forming the shell is not particularly limited, but from the viewpoint of the quantum confinement effect, ZnS, ZnSe, ZnSeS, ZnTeS, ZnTeSe, and the like are preferable. In particular, when a Zn element is present on the surface of the semiconductor nanoparticle, the effect of the present invention can be exerted to a greater extent.

When the nanoparticle has a plurality of shells, it is sufficient that at least one shell having the above-mentioned composition be included. Further, in the case of a gradient type shell in which the ratio of elements constituting the shell changes in the shell, the shell does not necessarily have to have the composition according to the composition notation.

Here, in the present invention, whether the shell covers at least a part of the core and the element distribution inside the shell can be confirmed by composition analysis by, for example, energy dispersive X-ray spectroscopy (TEM-EDX) using a transmission electron microscope.

<Method for Preparing Semiconductor Nanoparticles>

Disclosed hereinbelow is an example of a method for producing semiconductor nanoparticles to be included in semiconductor nanoparticle complexes.

(Core)

A core of a semiconductor nanoparticle can be formed by heating a precursor mixture obtained by mixing a Group III precursor, a Group V precursor, and, if necessary, an additive in a solvent.

A coordinating solvent or a non-coordinating solvent is used as the solvent. Examples of solvents include 1-octadecene, hexadecane, squalene, oleylamine, trioctylphosphine, trioctylphosphine oxide, and the like.

Examples of Group III precursors include, but are not limited to, acetates, carboxylates, halides, and the like containing the Group III elements.

Examples of Group V precursors include, but are not limited to, organic compounds and gases containing the Group V elements. Where the precursor is a gas, a core can be formed by reacting while injecting a gas into a precursor mixture including components other than the gas.

The semiconductor nanoparticles may include one or two or more elements other than Group III and Group V as long as the effects of the present invention are not impaired. In this case, the precursor(s) of the element(s) may be added at the time of core formation.

Examples of the additive include, but are not limited to, carboxylic acids, amines, thiols, phosphines, phosphine oxides, phosphinic acids, and phosphonic acids as dispersants. The dispersant can also serve as a solvent.

After forming the core of the semiconductor nanoparticles, the emission characteristics of the semiconductor nanoparticles can be improved by adding a halide as needed.

In one embodiment, an In precursor and, if necessary, a metal precursor solution obtained by adding a dispersant to a solvent are mixed under vacuum and heated once at 100° C. to 300° C. for 6 h to 24 h, followed by the addition of a P precursor, heating at 200° C. to 400° C. for 3 min to 60 min, and then cooling. Further, by adding a halogen precursor and heat-treating at 25° C. to 300° C., preferably 100° C. to 300° C., and more preferably 150° C. to 280° C., a core particle dispersion liquid including core particles can be obtained.

(Shell)

As a result of adding a shell-forming precursor to the synthesized core particle dispersion liquid, semiconductor nanoparticles have a core-shell structure, and the fluorescence quantum yield (QY) and stability can be improved.

The elements that constitute the shell are thought to have a structure such as an alloy, heterostructure, or amorphous structure on the surface of the core particles, but it is also conceivable that some of them have moved to the inside of the core particles due to diffusion.

The added shell-forming element is mainly present near the surface of the core particle and has a role of protecting the semiconductor nanoparticle from external factors. In the core-shell structure of the semiconductor nanoparticles, it is preferable that the shell covers at least a part of the core, and more preferably the entire surface of the core particle is uniformly covered.

In one embodiment, a Zn precursor and a Se precursor are added to the core particle dispersion liquid described above, then heating is performed at 150° C. to 300° C., preferably 180° C. to 250° C., and then the Zn precursor and the S precursor are added and heating is performed at 200° C. to 400° C., preferably 250° C. to 350° C. As a result, core-shell type semiconductor nanoparticles can be obtained.

Here, although not particularly limited, examples of suitable Zn precursors include carboxylates such as zinc acetate, zinc propionate and zinc myristate, halides such as zinc chloride and zinc bromide, and organic salts such as diethyl zinc.

Examples of suitable Se precursors include phosphine selenides such as tributylphosphine selenide, trioctylphosphine selenide and tris(trimethylsilyl)phosphine selenide, selenols such as benzeneselenol and selenocysteine, and selenium/octadecene solutions.

Examples of suitable S precursors include phosphine sulfides such as tributylphosphine sulfide, trioctylphosphine sulfide and tris(trimethylsilyl)phosphine sulfide, thiols such as octanethiol, dodecanethiol and octadecanethiol, and sulfur/octadecene solutions.

The precursors of the shell may be mixed in advance and added once or in multiple times, or each may be added separately once or in multiple times. When the shell precursors are added in multiple times, heating by changing the temperature may be performed after each shell precursor is added.

In the present invention, a method for producing semiconductor nanoparticles is not particularly limited, and in addition to the methods shown above, conventional methods such as a hot injection method, a uniform solvent method, a reverse micelle method, and a CVD method can be used, or any other method may be adopted.

<Semiconductor Nanoparticle Complex>

In the present invention, in a semiconductor nanoparticle complex, ligands are coordinated to the surface of the semiconductor nanoparticle. The coordination mentioned herein means that the ligand chemically affects the surface of the semiconductor nanoparticle. The ligand may be bonded to the surface of the semiconductor nanoparticle by coordination bonding or in any other bonding mode (for example, by covalent bond, ionic bond, hydrogen bond, and the like), or when the ligand is present on at least a portion of the surface of the semiconductor nanoparticle, the ligand does not necessarily have to form a bond.

(Ligand Composition)

In the present invention, the ligand that coordinates to the semiconductor nanoparticle is composed of an organic group and a coordinating group. The ligand in the semiconductor nanoparticle complex of the present invention includes an aliphatic ligand in which the organic group is an aliphatic hydrocarbon group and a polar ligand in which the organic group includes a hydrophilic functional group.

The aliphatic ligand preferably has one coordinating group and at least one or more aliphatic hydrocarbon groups bonded thereto. By adopting such a structure, a higher fluorescence quantum yield can be obtained for the semiconductor nanoparticle complex.

The coordinating group of the aliphatic ligand is preferably selected from the group consisting of an amino group, a carboxyl group, a mercapto group, a phosphine group, and a phosphine oxide group. By adopting such a structure, a higher fluorescence quantum yield can be obtained.

The polar ligand has a hydrophilic functional group in the organic group. The organic group of the polar ligand preferably has at least one of a hydroxyl group, a carboxyl group, a carbonyl group, a mercapto group, an amino group, an ether bond, an ester bond, and a siloxane bond as the hydrophilic functional group. Having a hydrophilic functional group in the organic group of the polar ligand enables dispersion in a polar dispersion medium.

In particular, when the coordinating group of the polar ligand is a mercapto group, the polar ligand can strongly coordinate to the semiconductor nanoparticle, so that high fluorescence quantum yield can be obtained and the heat resistance of the semiconductor nanoparticle complex is improved.

The molecular weight of the polar ligand is preferably 50 or more and 600 or less, and more preferably 50 or more and 450 or less. By using a ligand having a molecular weight of 600 or less, it is possible to suppress an increase in the size and volume of the semiconductor nanoparticle complex, and when using the semiconductor nanoparticle complex in a dispersion liquid, a composition, a cured film, and the like, it becomes easy to increase the mass fraction of the semiconductor nanoparticle complex with respect thereto. Meanwhile, where the molecular weight is 50 or more, the effect of steric hindrance is sufficiently exhibited, and when the semiconductor nanoparticle complex is dispersed in the dispersion medium, the occurrence of aggregation and the like can be suppressed.

(Ligand Ratio)

The mass ratio of the aliphatic ligand and the polar ligand (aliphatic ligand/polar ligand) is preferably 0.05 to 1.00, more preferably 0.10 to 1.00, and even more preferably 0.20 to 0.80. When the mass ratio is in this range, the semiconductor nanoparticle complex can be dispersed in a dispersion medium having a high SP value, and a semiconductor nanoparticle complex having high heat resistance can be obtained.

(Ligand/Semiconductor Nanoparticle)

The mass ratio of the ligand to the semiconductor nanoparticle (ligand/semiconductor nanoparticle) is preferably 0.1 to 0.7. When the mass ratio of the ligand to the semiconductor nanoparticle is in this range, an increase in the size and volume of the semiconductor nanoparticle complex can be suppressed, and when using the semiconductor nanoparticle complex in a dispersion liquid, a composition, a cured film, or the like, the mass fraction of the semiconductor nanoparticle complex therein can be increased. The mass ratio of the ligand to the semiconductor nanoparticle (ligand/semiconductor nanoparticle) is more preferably 0.1 to 0.5.

<Method for Producing Semiconductor Nanoparticle Complex>

The following is an example of a method for producing a semiconductor nanoparticle complex.

A method for coordinating a ligand to a semiconductor nanoparticle is not limited, and a ligand exchange method using the coordinating force of the ligand can be used. Specifically, semiconductor nanoparticles in which the organic compound used in the process of producing the semiconductor nanoparticles described above is coordinated to the surface of the semiconductor nanoparticles are brought into contact with the target ligand in a liquid phase, thereby making it possible to obtain a semiconductor nanoparticle complex in which the target ligand is coordinated to the surface of the semiconductor nanoparticle. In this case, a liquid-phase reaction using a solvent as described hereinbelow is usually carried out, but when the ligand to be used is a liquid under the reaction conditions, a reaction mode is possible in which the ligand itself is used as a solvent and no other solvent is added.

Further, where the below-described purification step and redispersion step are performed before the ligand is coordinated, the desired ligand can be easily coordinated.

When a non-coordinating solvent is used in the synthesis of the semiconductor nanoparticles, the formation of defects on the surface of the semiconductor nanoparticles can be minimized when the desired ligand is coordinated, and the fluorescence quantum yield can be prevented from reducing.

In one embodiment, the semiconductor nanoparticle-containing dispersion liquid after the semiconductor nanoparticles are produced is purified, then redispersed, and then a solvent including an aliphatic ligand is added, and a solvent including a polar ligand is further added under a nitrogen atmosphere. The desired semiconductor nanoparticle complex can be obtained by stirring at 50° C. to 200° C. for 1 min to 120 min. The aliphatic ligand and the polar ligand may be added at the same time.

(Purification)

The semiconductor nanoparticles and semiconductor nanoparticle complex can be purified in the following manner.

In one embodiment, the semiconductor nanoparticle complex can be precipitated from the dispersion liquid by adding a polarity-changing solvent such as acetone. The precipitated semiconductor nanoparticle complex can be collected by filtration or centrifugation, while supernatant containing unreacted starting materials and other impurities may be discarded or reused. The precipitated semiconductor nanoparticle complex can then be washed with additional dispersion medium and dispersed again. This purification process can be repeated, for example, 2 to 4 times, or until the desired purity is achieved.

In the present invention, the method for purifying the semiconductor nanoparticle complex is not particularly limited, and in addition to the methods shown above, for example, flocculation, liquid-liquid extraction, distillation, electrodeposition, size-selection chromatography and/or ultrafiltration, and the like may be used. Any method can be used alone or in combination.

<Dispersion Liquid>

In the present invention, the state in which the semiconductor nanoparticle complex is dispersed in a dispersion medium represents a state in which the semiconductor nanoparticle complex does not precipitate or a state in which the semiconductor nanoparticle complex does not remain creating visible turbidity (cloudiness) when the semiconductor nanoparticle complex and the dispersion medium are mixed. A liquid obtained by dispersing the semiconductor nanoparticle complex in a dispersion medium is referred to as a semiconductor nanoparticle complex dispersion liquid.

The semiconductor nanoparticle complex of the present invention can be dispersed in a dispersion medium to form a semiconductor nanoparticle complex dispersion liquid. It is preferable that the semiconductor nanoparticle complex can be dispersed in the dispersion medium to form a dispersion liquid even when the SP value of the dispersion medium is 9.0 or more.

The SP value here is the Hildebrand solubility parameter, which is a value calculated from the Hansen solubility parameter. The Hansen solubility parameter is a handbook value such as in, for example, "Hansen Solubility Parameters: A User's Handbook", 2nd Edition, C. M. Hanson (2007), or can be determined using a Practice (HSPiP) program (2nd edition) provided by Hanson and Abbot et al.

By setting the mass ratio of the aliphatic thiol ligand to the polar ligand as described above, it is possible to disperse the semiconductor nanoparticles in a dispersion medium having an SP value of 9.0 to 15.0. In particular, the semiconductor nanoparticles can be dispersed in at least one dispersion medium among acetone, propylene glycol monomethyl ether acetate (PGMEA), propylene glycol monomethyl ether (PGME), IPA, ethanol, methanol, and mixtures of any combinations of dispersion media from this group. By dispersing in these organic dispersion media, the resulting dispersion liquid can be used while maintaining the dispersibility of the semiconductor nanoparticle complex when applied to dispersion in a cured membrane or a resin described hereinbelow. In particular, in the field of photoresists, PGMEA is generally used as a diluting solvent, and where the semiconductor nanoparticle complex can be dispersed in PGMEA, the semiconductor nanoparticle complex can be widely used in the photoresist field.

In the present invention, as the dispersion medium having the semiconductor nanoparticle complex dispersed therein, a monomer can be selected. The monomer is not particularly limited, but an acrylic monomer that enables selection of a wide range of applications for the semiconductor nanoparticles is preferable. The (meth)acrylic monomer can be selected according to the application of the semiconductor nanoparticle complex dispersion liquid from the group consisting of methyl (meth)acrylate, ethyl (meth)acrylate, propyl (meth)acrylate, butyl (meth)acrylate, isobutyl (meth)acrylate, isoamyl (meth)acrylate, octyl (meth)acrylate, 2-ethylhexyl (meth)acrylate, dodecyl (meth)acrylate, isodecyl (meth)acrylate, lauryl (meth)acrylate, stearyl (meth)acrylate, cyclohexyl (meth)acrylate, isobornyl (meth)acrylate, 3,5,5-trimethylcyclohexanol (meth)acrylate, dicyclopentanyl (meth)acrylate, dicyclopentenyl (meth)acrylate, methoxyethyl (meth)acrylate, ethyl carbitol (meth)acrylate, methoxytriethylene glycol acrylate, 2-ethylhexyl diglycol acrylate, methoxypolyethylene glycol acrylate, methoxydipropylene glycol acrylate, phenoxyethyl (meth)acrylate, 2-phenoxydiethylene glycol (meth)acrylate, 2-phenoxypolyethylene glycol (meth)acrylate (n≈2), tetrahydrofurfuryl (meth)acrylate, 2-hydroxyethyl acrylate, 2-hydroxypropyl (meth)acrylate, 4-hydroxybutyl (meth)acrylate, 2-hydroxybutyl (meth)acrylate, dicyclopentanyloxyl ethyl (meth)acrylate, isobornyloxyl ethyl (meth)acrylate, adamantyl (meth)acrylate, dimethyladamantyl (meth)acrylate, dicyclopentenyloxyethyl (meth)acrylate, benzyl (meth)acrylate, ω-carboxy-polycaprolactone (n≈2) monoacrylate, 2-hydroxy-3-phenoxypropyl acrylate, 2-hydroxy-3-phenoxyethyl (meth)acrylate, (2-methyl-2-ethyl-1,3-dioxolan-4-yl) methyl (meth)acrylate, (3-ethyloxetane-3-yl) methyl (meth)acrylate, o-phenylphenolethoxy (meth)acrylate, dimethylamino (meth)acrylate, diethylamino (meth)acrylate, 2-(meth)acryloyloxyethylphthalic acid, 2-(meth)acryloyloxyethylhexahydrophthalic acid, glycidyl (meth)acrylate, 2-(meth)acryloyloxyethylphosphoric acid, acryloylmorpholine, dimethylacrylamide, dimethylaminopropylacrylamide, iropropylacrylamide, diethylacrylamide, hydroxyethylacrylamide, and N-acryloyloxyethyl hexahydrophthalimide. These can be used alone or in combination of two or more.

In particular, the acrylic monomer is preferably one or a mixture of two or more selected from lauryl (meth)acrylate and 1,6-hexadioldi (meth)acrylate depending on the application of the semiconductor nanoparticle complex dispersion liquid.

When the semiconductor nanoparticle complex has the above-mentioned configuration, the semiconductor nanoparticle complex can be dispersed in the dispersion medium at a high mass fraction. The semiconductor nanoparticle complex is preferably dispersible in at least one of the dispersion medium and the monomer so that the mass fraction of the semiconductor nanoparticles is 25% by mass or more.

(Thermogravimetric Analysis)

FIG. 1 shows the results of thermal analysis of the semiconductor nanoparticle complex of an embodiment of the present invention. Thermal analysis is performed by thermogravimetric analysis and ligand identification. Thermogravimetric analysis is performed by a method involving heating the semiconductor nanoparticle complex to 550° C. at 10° C./min, holding it for 10 min, and lowering the temperature under a nitrogen atmosphere by using differential thermal weight analysis (DTA-TG).

The solid line is the result of thermogravimetric analysis (TG), and the broken line is the result of the derivative of TG (ΔTG). As the temperature of the semiconductor nanoparticle complex was raised, a mass reduction due to ligand detachment was observed. Since the mass reduction was almost constant at 500° C. or higher (mass reduction rate per 10° C. was less than 0.15%), the ligand in the semiconductor nanoparticle complex was almost detached by 500° C., and the ratio of the amount of ligand to the total semiconductor nanoparticle in the present embodiment was calculated to be 32%. Further, the mass reduction rate ($X_H$) of the semiconductor nanoparticle complex of the present embodiment was 6% in the range of 350° C. or higher and 550° C. or lower. When the semiconductor nanoparticle complex is heated to 700° C., almost all the ligands are detached from the semiconductor nanoparticles.

In the semiconductor nanoparticle complex according to an embodiment of the present invention, a ratio ($\{(X_H)/L\} \times 100$) of the mass reduction rate of the semiconductor nanoparticle complex in the range of 350° C. or higher and 550° C. or lower in the thermogravimetric analysis ($X_H$) to a mass fraction of all ligands in the semiconductor nanoparticle complex at room temperature (L) is 10 or more and 55 or less. This means that of all the ligands coordinated to the semiconductor nanoparticles at room temperature, the ligands in a mass proportion of 10 to 55 detach from the surface of the semiconductor nanoparticles in the high-temperature range of 350° C. or higher and 550° C. or lower, rather than in the low-temperature range from room temperature to 350° C. When the proportion of the ligands that detach from the surface of the semiconductor nanoparticles in the high temperature range of 350° C. or higher and 550° C. or lower is 10 to 55, it is an index for obtaining a semiconductor nanoparticle complex having high optical properties. The above ratio ($\{(X_H)/L\} \times 100$) is more preferably 10 to 50.

Further, in the semiconductor nanoparticle complex according to another embodiment of the present invention, a mass reduction rate of the semiconductor nanoparticle complex in the range of 350° C. or higher and 550° C. or lower ((mass reduction amount of semiconductor nanoparticle complex in the range of 350° C. or higher and 550° C. or lower)/(mass of semiconductor nanoparticle complex at room temperature)×100) is 2% or more and 15% or less. When the mass reduction rate is within this range, the semiconductor nanoparticle complex has high fluorescence quantum yield.

In the semiconductor nanoparticle complex according to an embodiment of the present invention, the relationship between a ratio ($X_L/X$) of "a mass reduction rate in the range from room temperature to 350° C. ($X_L$)" to "a mass reduction rate when the semiconductor nanoparticle complex was heated from room temperature to 700° C. (X)", and a ratio ($L_P/L$) of "a mass fraction of a polar ligand in the semiconductor nanoparticle complex at room temperature ($L_P$)" to "a mass fraction of all ligands in the semiconductor nanoparticle complex at room temperature (L)" is ($X_L/X$)<($L_P/L$).

When the relationship of ($X_L/X$)<($L_P/L$) is established as described above, it means that at least some of polar ligands are strongly coordinated without being detached from the semiconductor nanoparticles even in a high-temperature region of 350° C. or higher. As will be described hereinbelow, the aliphatic ligand detaches from the surface of the semiconductor nanoparticle in a temperature region higher than that of the polar ligand. The ligand strongly coordinated to the semiconductor nanoparticle in this way covers the surface of the semiconductor nanoparticle with a force sufficient to impart weather resistance to the surface of the semiconductor nanoparticles not only at room temperature but also in the temperature range used for applications, so that the semiconductor nanoparticle complex according to the embodiment of the present invention exhibits high optical activity.

As described above, where the semiconductor nanoparticle complex of the present invention is heated to 700° C., almost all ligands are detached from the semiconductor nanoparticles. Therefore, "a mass reduction rate when the semiconductor nanoparticle complex is heated from room temperature to 700° C. (X)" and "a mass fraction of all ligands coordinated to the semiconductor nanoparticle with respect to the semiconductor nanoparticle complex at room temperature (L)" have almost the same value.

Furthermore, from the above ΔTG results, two peaks were confirmed around 310° C. and around 430° C. These are due to the detachment of corresponding ligands. Assuming that the temperature at which the area occupied by each peak area of the differential thermal measurement exceeds 2% is the detachment temperature of each ligand, the detachment temperature of the ligand at a low temperature can be calculated as 205° C., and the detachment temperature of the ligand at a high temperature can be calculated as 394° C. The detached ligand can be identified by using an infrared absorption spectrum.

First, a method for calculating the type and mass ratio of the ligands in the semiconductor nanoparticle complex using the infrared absorption spectrum will be described. Infrared absorption spectrum data were collected for semiconductor nanoparticle complex pellet prepared by a KBr tablet method using FT/IR-4200 manufactured by JASCO Corporation.

Figure 2:
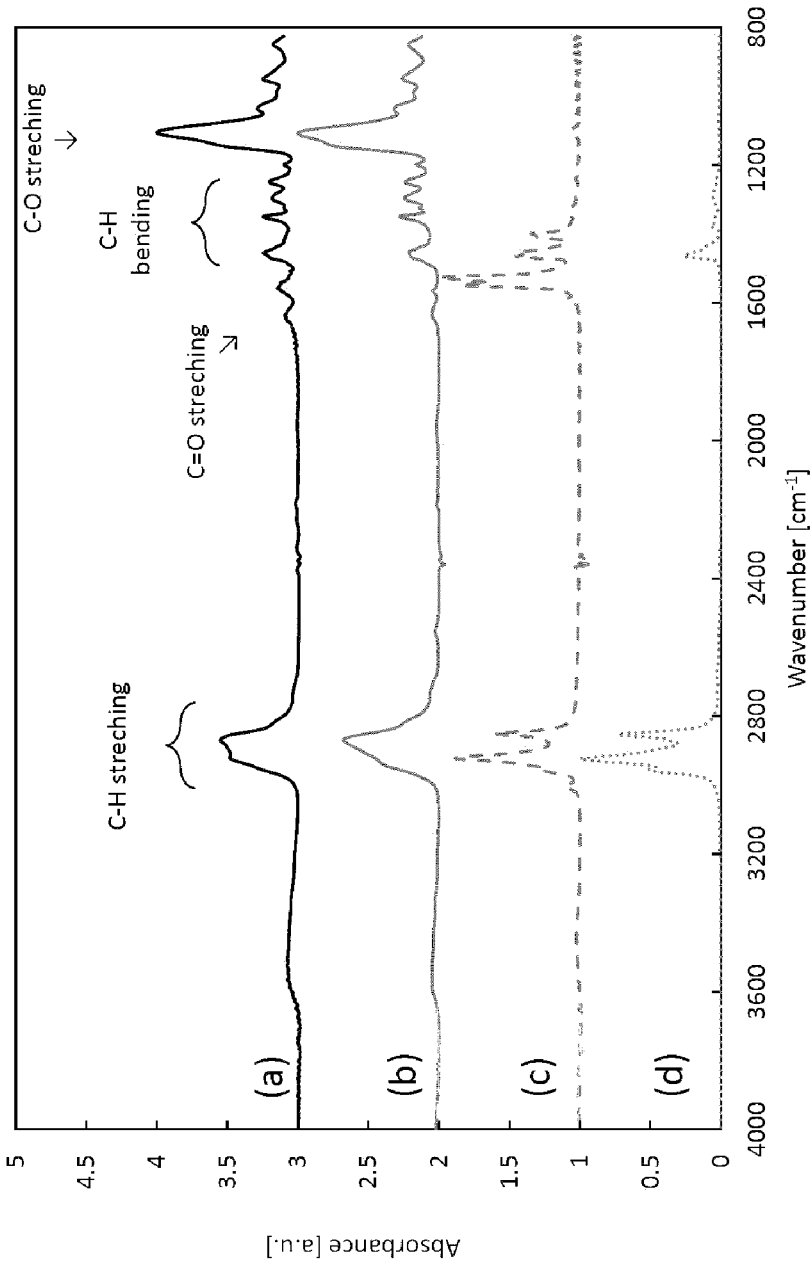
FIG. 2 shows an infrared absorption spectrum of the semiconductor nanoparticle complex and a ligand alone according to the embodiment of the present invention.

FIG. 2(a) shows an infrared absorption spectrum of the semiconductor nanoparticle complex of the present embodiment. The absorption peaks of C—H stretching and C—H vending were observed near 2900 cm$^{-1}$ and 1450 cm$^{-1}$, the absorption peak of C=O stretching was observed near 1550 cm$^{-1}$, and the absorption peak of C—O stretching was observed near 1100 cm$^{-1}$. The absorption peaks appearing at 2300 cm$^{-1}$ to 2500 cm$^{-1}$ are due to carbon dioxide.

FIGS. 2(b), 2(c), and 2(d) show infrared absorption spectra of the ligand alone, which is considered to be present in the semiconductor nanoparticle complex of the present embodiment. In the present embodiment, one polar ligand and two aliphatic ligands are coordinated to the semiconductor nanoparticle. In the present embodiment, the ligand (b) is a polar ligand, and the ligand (c) and the ligand (d) are aliphatic ligands.

Since the absorbance of the infrared absorption spectrum is proportional only to the concentration and thickness of the substance, it is possible to perform quantitative analysis from the peak area.

Generally, assuming that the infrared absorption spectrum of a semiconductor nanoparticle complex is $S_{QD}(v)$, the infrared absorption spectrum of the i-th aliphatic ligand is $S_{ai}(v)$, and the infrared absorption spectrum of the i-th polar ligand is $S_{pi}(v)$, the spectra can be represented as in Equation (1).

$$S_{QD}(v)=\Sigma a i S_{ai}(v)+\Sigma p i S_{pi}(v) \qquad \text{Equation (1)}$$

Here, v is the wave number, and ai and pi are constants related to the mole fraction of the aliphatic ligand and the polar ligand, respectively.

For example, in the infrared absorption spectrum of the semiconductor nanoparticle complex of the present embodiment, assuming that the spectrum of the polar ligand of (b) is $S_{(b)}(v)$, and the spectra of the aliphatic ligands of (c) and (d) are $S_{(c)}(v)$ and $S_{(d)}(v)$, respectively. The spectra can be represented as in Equation (2).

$$S_{QD}(v)=bS_{(b)}(v)+cS_{(c)}(v)+dS_{(d)}(v) \qquad \text{Equation (2)}$$

Figure 3:
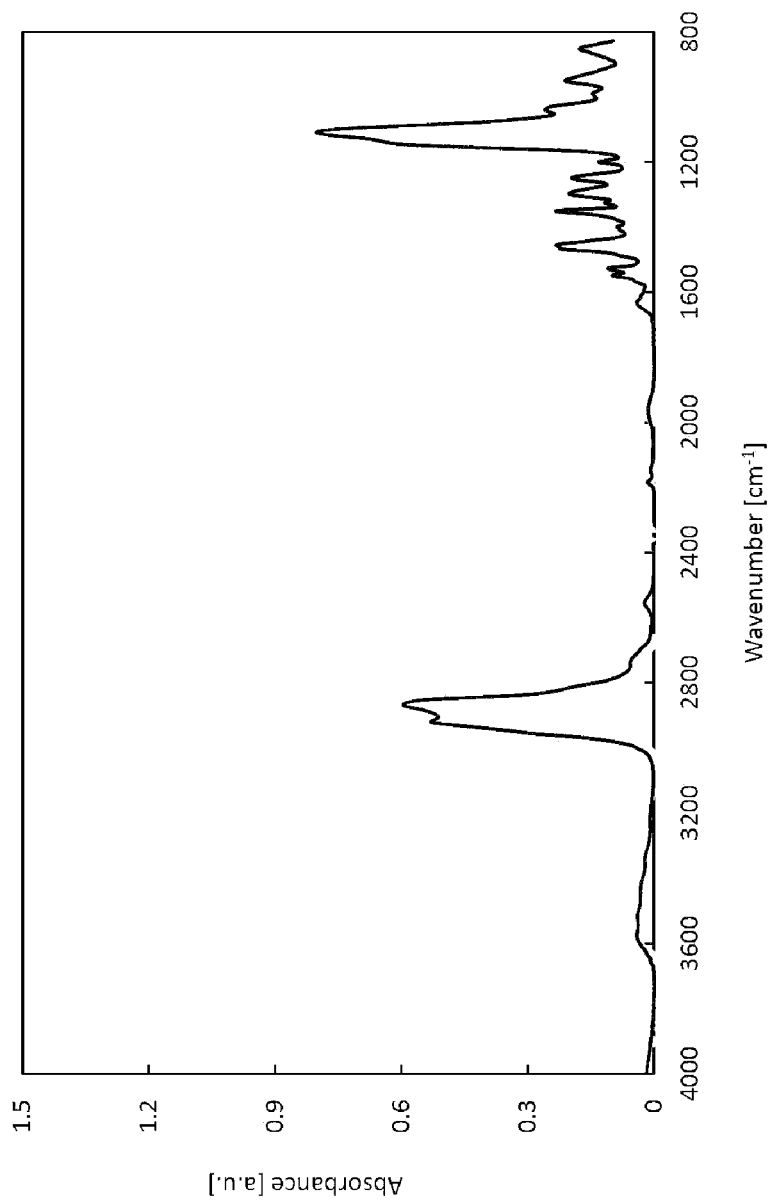
FIG. 3 is a diagram in which actually measured values and calculated values of the infrared absorption spectrum of the semiconductor nanoparticle complex according to the embodiment of the present invention are fitted.

Here, v is the wave number, and b, c, and d are constants. The values of the constants b, c, and d that minimize the residual sum of squares of the measured and calculated values were determined using a solver function of Excel (Microsoft spreadsheet software). FIG. 3 shows data obtained by fitting the measured values and the calculated values of the infrared absorption spectra. The dotted line represents the measured values and the solid line represents the calculated values. It can be seen that the measured values are well represented by the calculated values.

Figure 4:
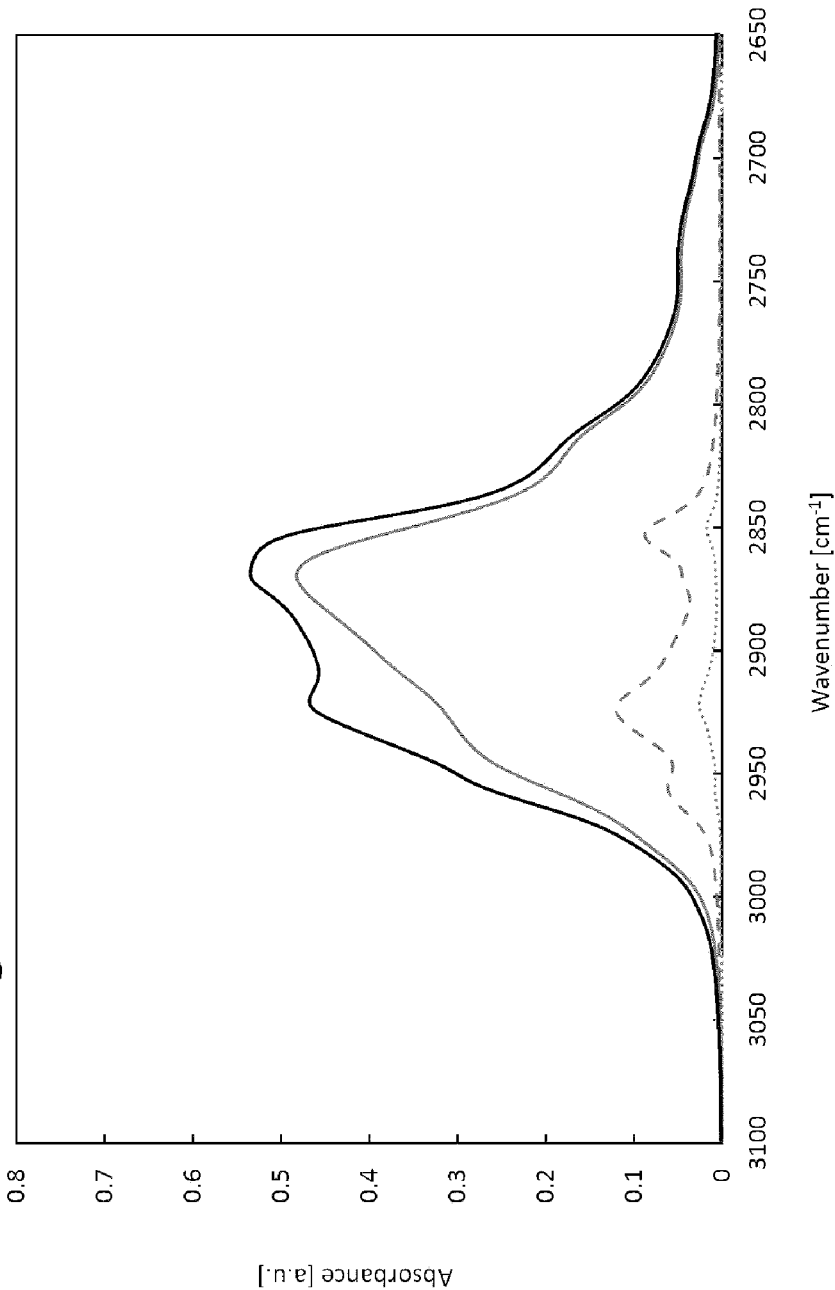
FIG. 4 shows the configuration of an infrared absorption spectrum of each ligand component in the fitting curve for the absorption peak of C—H stretching of the semiconductor nanoparticle complex according to the embodiment of the present invention.

FIG. 4 shows the configuration of the infrared absorption spectrum of each ligand component in the fitting curve for the absorption peak of C—H stretching. In FIG. 4, similarly to FIGS. 3 and 2, the dotted line shows the measured values of the infrared absorption spectrum of the semiconductor nanoparticle complex, the gray solid line shows the measured values of the infrared absorption spectrum of the ligand (b), two gray broken lines show the measured values of the infrared absorption spectra of the ligands (c) and (d), respectively. The solid black line is the calculated value, and it can be seen that the measured values are well represented by the calculated values. Since the absorption peak of C—H stretching includes the absorption of all the ligand components in the semiconductor nanoparticle complex, the composition of the ligand can be obtained from the peak area ratio of the ligand components obtained by waveform separation. The mass fraction of each ligand component was calculated from the peak area ratio, the number of protons in the molecule, and the molecular weight. FIG. 4 shows the measurement results of the semiconductor nanoparticle complex obtained in Example 1 described hereinbelow. In this example, it can be calculated that the mass fraction of the ligand components is ligand (b):ligand (c):ligand (d)=89:

8:3, that is, the mass ratio of the polar ligand (b) to the aliphatic ligands ((c)+(d)) is 89:11.

Ligands desorbed at low temperature in thermal analysis are identified using the method described above.

Figure 5:
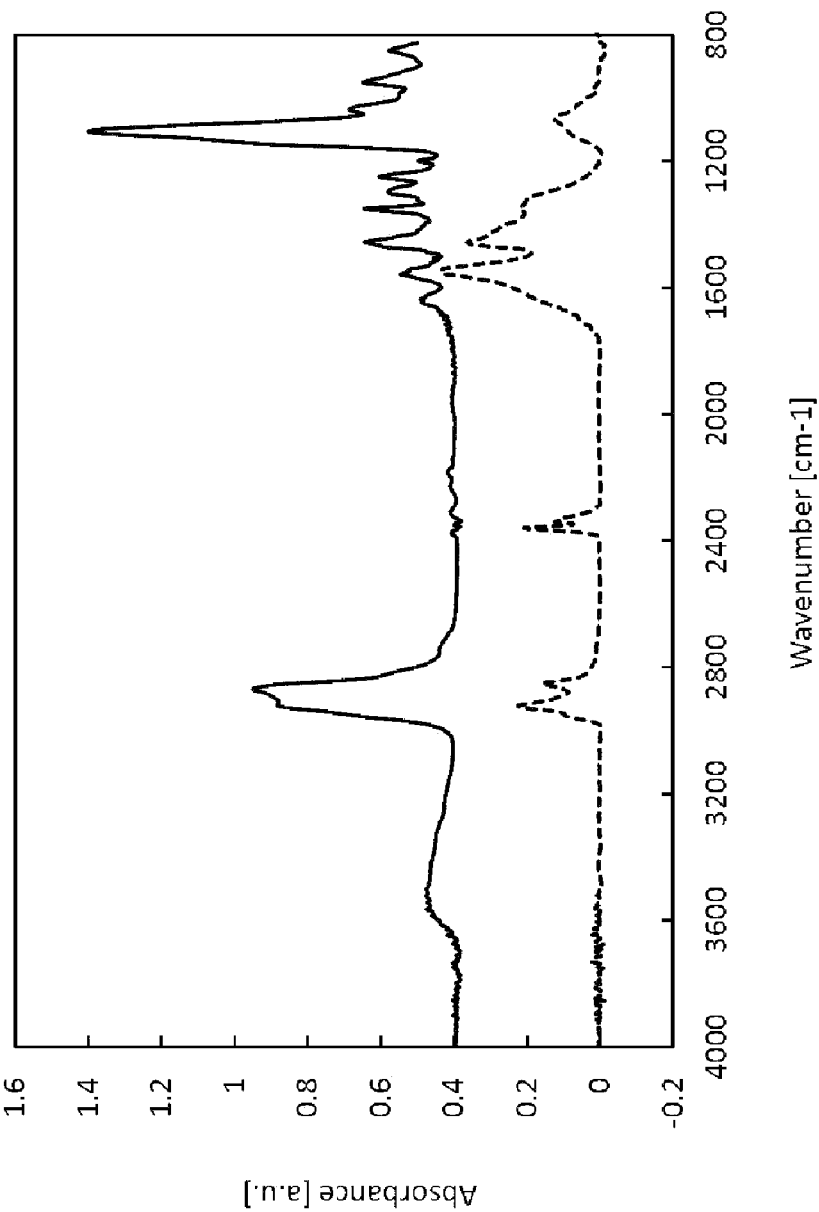
FIG. 5 shows the infrared absorption spectra of the semiconductor nanoparticle complex according to the embodiment of the present invention before and after heat treatment.

FIG. 5 shows an infrared absorption spectrum of the semiconductor nanoparticle complex of the present embodiment before and after the heat treatment. The solid line is the infrared absorption spectrum of the semiconductor nanoparticle complex before the heat treatment, and the broken line is the infrared absorption spectrum of the semiconductor nanoparticle complex heated to 350° C. at 10° C./min in a nitrogen atmosphere and cooled to room temperature.

In the infrared absorption spectrum of the semiconductor nanoparticle complex before the heat treatment, a sharp absorption peak of C—O stretching is observed near 1100 $cm^{-1}$, while it is clear that in the semiconductor nanoparticle complex heated to 350° C., the intensity of this peak becomes considerably weaker. Since strong absorption peaks of C—H stretching and C—H vending near 2900 $cm^{-1}$ and 1450 $cm^{-1}$ are observed in the semiconductor nanoparticle complex heated to 350° C., it can be said that the ligand detached at a low temperature as confirmed by ΔTG belongs to the polar ligand (b), and the components detached at a high temperature of 350° C. or higher belong to the aliphatic ligands (c) and (d). As described above, the absorption peaks appearing at 2300 $cm^{-1}$ to 2500 $cm^{-1}$ are due to carbon dioxide.

A method for calculating the mass fraction of all ligands in the semiconductor nanoparticle complex at room temperature (L) is described hereinbelow.

In the abovementioned thermogravimetric analysis, assuming that the end point is the point where the mass reduction amount of the semiconductor nanoparticle complex is substantially constant, the mass reduction amount up to the end point indicates the total amount of ligands coordinated to the semiconductor nanoparticle at room temperature. The detachment temperature of a ligand coordinated to the semiconductor nanoparticle changes depending on the type of the ligand. Therefore, in order to calculate the mass fraction of all ligands in the semiconductor nanoparticle complex at room temperature (L), the determination may be made using the thermogravimetric analysis result (mass reduction amount) when the heating temperature is 700° C. or higher.

The above measurement results of thermogravimetric analysis and the measurement results of infrared absorption spectrum clearly demonstrate a specific feature that where the semiconductor nanoparticle complex described in the present application is heated, the aliphatic ligand is detached from the surface of the semiconductor nanoparticle at a temperature higher than that of the polar ligand. Furthermore, at least some of the components detached at 350° C. or higher are attributed to the aliphatic ligands.

For reference, it is disclosed that the aliphatic ligand (dodecanethiol) described in Non-Patent Literature 6 is detached from the bound Zn at about 250° C. to 300° C. The detachment temperature of the aliphatic ligand in the semiconductor nanoparticle complex described in the present application is higher than that in the literature.

It is conceivable that the detachment temperature of the ligand is greatly affected not only by the chemical structure but also by the interaction with surrounding atoms and molecules, such as the coordination form with Zn present on the surface of the semiconductor nanoparticle and the formation of the crystal structure of the ligand, and the aliphatic ligand coordinated to the semiconductor nanoparticle described in the present application is strongly restrained on the surface of the semiconductor nanoparticle due to the factors as described above, and shows a high detachment temperature. The inventors speculate that the presence of such aliphatic ligands strongly restrained on the surface of the semiconductor nanoparticle improves the fluorescence quantum yield of the semiconductor nanoparticle. The inventors speculate that the presence of the abovementioned aliphatic ligands also has the effect of improving heat resistance.

The semiconductor nanoparticle complex of the present invention has the following configuration.

(1) A semiconductor nanoparticle complex in which two or more ligands including an aliphatic ligand and a polar ligand are coordinated to a surface of a semiconductor nanoparticle, wherein
the ligands are composed of an organic group and a coordinating group;
in the aliphatic ligand, the organic group is an aliphatic hydrocarbon group;
the polar ligand includes a hydrophilic functional group in the organic group;
a mass ratio of the aliphatic ligand to the polar ligand (aliphatic ligand/polar ligand) is 0.05 to 1.00;
a ratio ($\{(X_H)/L\} \times 100$) of a mass reduction rate of the semiconductor nanoparticle complex in a range of 350° C. or higher and 550° C. or lower in a thermogravimetric analysis ($X_H$) to a mass fraction of all ligands in the semiconductor nanoparticle complex at room temperature (L) is 10 or more and 55 or less.

(2) A semiconductor nanoparticle complex in which two or more ligands including an aliphatic ligand and a polar ligand are coordinated to the surface of a semiconductor nanoparticle, wherein
the ligands are composed of an organic group and a coordinating group;
in the aliphatic ligand, the organic group is an aliphatic hydrocarbon group;
the polar ligand includes a hydrophilic functional group in the organic group;
a mass ratio of the aliphatic ligand to the polar ligand (aliphatic ligand/polar ligand) is 0.05 to 1.00;
a mass reduction rate of the semiconductor nanoparticle complex in a range of 350° C. or higher and 550° C. or lower in a thermogravimetric analysis ($X_H$) is 2% or more and 15% or less.

(3) The semiconductor nanoparticle complex as described in (1) or (2) hereinabove, wherein
when the semiconductor nanoparticle complex is heated, the polar ligand is detached from the surface of the semiconductor nanoparticles at a lower temperature than the aliphatic ligand.

(4) The semiconductor nanoparticle complex as described in any one of (1) to (3) hereinabove, wherein
in the thermogravimetric analysis,
the relationship between
a ratio ($X_L/X$) of a mass reduction rate in the range from room temperature to 350° C. ($X_L$) to a mass reduction rate when the semiconductor nanoparticle complex was heated from room temperature to 700° C. (X), and
a ratio ($L_P/L$) of a mass fraction of a polar ligand in the semiconductor nanoparticle complex at room temperature ($L_P$) to a mass fraction of all ligands in the semiconductor nanoparticle complex at room temperature (L) is
($X_L/X$)<($L_P/L$).

(5) The semiconductor nanoparticle complex as described in any one of (1) to (4) hereinabove, wherein
the semiconductor nanoparticle complex can be dispersed in a dispersion medium having an SP value of 9.0 to 15.0.

(6) The semiconductor nanoparticle complex as described in (5) hereinabove, wherein
the dispersion medium is one selected from the group consisting of acetone, PGMEA, PGME, IPA, ethanol, and methanol, or a mixed dispersion medium of two or more thereof.

(7) The semiconductor nanoparticle complex as described in any one of (1) to (6) hereinabove, wherein
at least a part of reduction in mass at 350° C. or higher is attributed to detachment of the aliphatic ligand.

(8) The semiconductor nanoparticle complex as described in any one of (1) to (7) hereinabove, wherein
the aliphatic ligand has one coordinating group and at least one or more aliphatic hydrocarbon groups bonded thereto.

(9) The semiconductor nanoparticle complex as described in any one of (1) to (8) hereinabove, wherein
the molecular weight of the polar ligand is 50 or more and 600 or less.

(10) The semiconductor nanoparticle complex as described in any one of (1) to (9) hereinabove, wherein
the molecular weight of the polar ligand is 50 or more and 450 or less.

(11) The semiconductor nanoparticle complex as described in any one of (1) to (10) hereinabove, wherein
the coordinating group of the aliphatic ligand is selected from the group consisting of an amino group, a carboxyl group, a mercapto group, a phosphine group, and a phosphine oxide group.

(12) The semiconductor nanoparticle complex as described in any one of (1) to (11) hereinabove, wherein
the organic group of the polar ligand has at least one of a hydroxyl group, a carboxyl group, a carbonyl group, a mercapto group, an amino group, an ether bond, an ester bond, and a siloxane bond.

(13) The semiconductor nanoparticle complex as described in any one of (1) to (12) hereinabove, wherein
the coordinating group of the polar ligand is a mercapto group.

(14) The semiconductor nanoparticle complex as described in any one of (1) to (13) hereinabove, wherein
the mass ratio of the ligand to the semiconductor nanoparticle (ligand/semiconductor nanoparticle) is 0.1 to 0.7.

(15) The semiconductor nanoparticle complex as described in any one of (1) to (14) hereinabove, wherein
the mass ratio of the ligand to the semiconductor nanoparticles (ligand/semiconductor nanoparticles) is 0.1 to 0.5.

(16) The semiconductor nanoparticle complex as described in any one of (5) to (15) hereinabove, that can be dispersed in the dispersion medium at a mass fraction of the semiconductor nanoparticles of 25% by mass or more.

(17) The semiconductor nanoparticle complex as described in any one of (5) to (16) hereinabove, that can be dispersed in the dispersion medium at a mass fraction of the semiconductor nanoparticles of 35% by mass or more.

(18) The semiconductor nanoparticle complex as described in any one of (1) to (17) hereinabove, wherein
the semiconductor nanoparticle includes Zn on the surface of the semiconductor nanoparticle.

(19) The semiconductor nanoparticle complex as described in any one of (1) to (18) hereinabove, wherein
a fluorescence quantum yield of the semiconductor nanoparticle complex is 80% or more.

(20) The semiconductor nanoparticle complex as described in any one of (1) to (19) hereinabove, wherein
a full width at half maximum of emission spectrum of the semiconductor nanoparticle complex is 40 nm or less.

(21) The semiconductor nanoparticle complex as described in any one of (1) to (20) hereinabove, wherein
the semiconductor nanoparticle includes In and P.

(Doctrine of Equivalents)

The configurations and/or methods set forth in the present description are illustrated by way of example and can be changed in a variety of ways. Therefore, it can be understood that specific examples or embodiments thereof should not be considered to be limiting. The particular procedure or method set forth in the present description may represent one of a number of processing methods. Thus, various operations explained and/or described can be performed in the order explained and/or described, or can be omitted. Similarly, the order of the above methods can be changed.

The subject matter of the present disclosure is inclusive the various methods, systems and configurations disclosed in the present description, as well as any new and non-trivial combinations and secondary combinations of other features, functions, operations, and/or properties, as well as any equivalents thereof.

EXAMPLES

Hereinafter, the present invention will be specifically described with reference to Examples and Comparative Examples, but the present invention is not limited thereto.

Example 1

First, semiconductor nanoparticles were synthesized according to the following method.
(Preparation of Precursors)
<Preparation of Zn Precursor Solution>

A total of 40 mmol of zinc oleate and 75 mL of octadecene were mixed and heated in vacuum at 110° C. for 1 h to prepare a Zn precursor of [Zn]=0.4 M.
<Preparation of Se Precursor (Trioctylphosphine Selenide)>

A total of 22 mmol of selenium powder and 10 mL of trioctylphosphine were mixed in nitrogen and stirred until complete dissolution to obtain trioctylphosphine selenide of [Se]=2.2 M.
<Preparation of S Precursor (Trioctylphosphine Sulfide)>

A total of 22 mmol of sulfur powder and 10 mL of trioctylphosphine were mixed in nitrogen and stirred until complete dissolution to obtain trioctylphosphine sulfide of [S]=2.2 M.
(Synthesis of Semiconductor Nanoparticles)

Indium acetate (0.3 mmol) and zinc oleate (0.6 mmol) were added to a mixture of oleic acid (0.9 mmol), 1-dodecanethiol (0.1 mmol) and octadecene (10 mL), followed by heating to about 120° C. and reacting for 1 h under vacuum (<20 Pa). The mixture that has reacted under vacuum was placed in a nitrogen atmosphere at 25° C., tris(trimethylsilyl)phosphine (0.2 mmol) was added thereto, and then the mixture was heated to about 300° C. and reacted for 10 min. The reaction liquid was cooled to 25° C., octanoic chloride (0.45 mmol) was injected thereinto, and the reaction liquid was heated at about 250° C. for 30 min and then cooled to 25° C.

The, heating was performed to 200° C., and 0.75 mL of the Zn precursor solution and 0.3 mmol of trioctylphosphine selenide were added at the same time and reacted for 30 min to form a ZnSe shell on the surface of InP-based semiconductor nanoparticle. Further, 1.5 mL of the Zn precursor solution and 0.6 mmol of trioctylphosphine sulfide were added, the temperature was raised to 250° C., and the mixture was reacted for 1 h to form a ZnS shell.

The reaction solution of the semiconductor nanoparticles obtained by the synthesis was added to acetone, mixed well, and then centrifuged. The centrifugal acceleration was 4000 G. The precipitate was collected, and normal hexane was added to the precipitate to prepare a dispersion liquid. This operation was repeated several times to obtain purified semiconductor nanoparticles.

Subsequently, a semiconductor nanoparticle complex was synthesized according to the following method.
(Preparation of Ligand Unit)
<Preparation of PEG-SH>

A total of 210 g of methoxy-PEG-OH (molecular weight 400) and 93 g of trimethylamine were placed in a flask and dissolved in 420 mL of THF (tetrahydrofuran). The solution was cooled to 0° C., and 51 g of methanesulfonic acid chloride was gradually added dropwise under a nitrogen atmosphere, while taking care that the temperature of the reaction solution did not exceed 5° C. due to the heat of reaction. Then, the reaction solution was heated to room temperature and stirred for 2 h. This solution was extracted with a chloroform-water system to collect the organic phase. The obtained solution was concentrated by evaporation, and an oily intermediate was obtained in magnesium sulfate. This was transferred to another 1 L flask, and 400 mL of 1.3 M aqueous thiourea solution was added under a nitrogen atmosphere. The solution was refluxed for 2 h, then 21 g of NaOH was added and the solution was refluxed for another 1.5 h. The reaction solution was cooled to room temperature, and a 1M aqueous HCl solution was added to reach pH=7 to neutralize the reaction solution. The obtained solution was extracted with a chloroform-water system to obtain the desired ligand (PEG-SH, molecular weight 430).

PEG-SH with a molecular weight of 600 was obtained by the same method, except that PEG-SH methoxy-PEG-OH (molecular weight 400, 210 g) was changed to methoxy-PEG-OH (molecular weight 600, 315 g) in the step of synthesizing PEG-SH with a molecular weight of 400.
<Preparation of N-acetyl-N-(2-mercaptoethyl)propanamide>

A total of 1.2 g (10 mmol) of N-(2-sulfanylethyl)acetamide and 1.7 mL (12 mmol) of triethylamine were placed in a 100 mL round-bottom flask and dissolved in 30 mL of dehydrated dichloromethane. The solution was cooled to 0° C., and 0.87 mL (10 mmol) of propanoyl chloride was slowly added dropwise under a nitrogen atmosphere, while taking care that the temperature of the solution did not become equal to or higher than 5° C. After completion of the dropping, the reaction solution was heated to room temperature and stirred for 2 h. The reaction solution was filtered and the filtrate was diluted with chloroform. The solution was extracted in the order of 10% HCl aqueous solution, 10% $Na_2CO_3$ aqueous solution, and saturated NaCl aqueous solution, and the organic phase was collected. The organic phase was concentrated by evaporation and then purified by column chromatography using a hexane-ethyl acetate mixed solvent as a developing solvent to obtain the desired product.
(Preparation of Semiconductor Nanoparticle Complex)

A semiconductor nanoparticles-1-octadecene dispersion liquid was prepared in a flask by dispersing the purified semiconductor nanoparticles in 1-octadecene so as to obtain a mass ratio of the nanoparticles of 10% by mass. A total of 10.0 g of the prepared semiconductor nanoparticles-1-octadecene dispersion liquid was placed in a flask, 0.2 g of dodecanethiol (DDT) was added as an aliphatic thiol ligand, 4.0 g of PEG-SH was further added as a polar ligand, and stirring was performed at 110° C. for 60 min under a nitrogen atmosphere, followed by cooling to 25° C. to obtain a semiconductor nanoparticle complex. The reaction solution containing the semiconductor nanoparticle complex was transferred to a centrifuge tube and centrifuged at 4000 G for 20 min to separate into a transparent 1-octadecene phase and a semiconductor nanoparticle complex phase. The 1-octadecene phase was removed and the remaining semiconductor nanoparticle complex phase was collected.
(Washing Step)

A total of 5.0 mL of acetone was added to the obtained semiconductor nanoparticle complex phase to prepare a dispersion liquid. A total of 50 mL of normal hexane was added to the obtained dispersion liquid, followed by centrifugation at 4000 G for 20 min. After centrifugation, the clear supernatant was removed and the precipitate was collected. This operation was repeated several times to obtain a purified semiconductor nanoparticle complex.
(Measurement of Emission Characteristics of Semiconductor Nanoparticle Complex)

The emission characteristics of the semiconductor nanoparticle complex were measured using a fluorescence quantum yield measurement system (QE-2100, manufactured by Otsuka Electronics Co., Ltd.). The obtained semiconductor nanoparticle complex was dispersed in a dispersion medium, and a single light of 450 nm was used to obtain an emission spectrum. The fluorescence quantum yield (QY) and full width at half maximum (FWHM) were calculated from the emission spectrum after re-excitation correction in which a re-excitation fluorescence emission spectrum corresponding to fluorescence emission by re-excitation was excluded from the emission spectrum obtained herein. PGMEA was used as the dispersion liquid. Where the complex did not disperse in PGMEA, the dispersion liquid was changed to normal hexane.
(Thermogravimetric Analysis Measurement of Semiconductor Nanoparticle Complex)

FIG. 1 shows a TG curve and a derivative (ΔTG) curve thereof when the semiconductor nanoparticle complex (Example 1) having the above-described configuration was heated from 25° C. to 550° C. at 10° C./min in thermogravimetric analysis (TGA). The measurement was carried out using TG-DTA2000SA (manufactured by Bruker Corp.) under a nitrogen flow of 200 ml/min.

In the semiconductor nanoparticle complex of Example 1, the mass reduction rate in the range from room temperature to 350° C. was 25%, and the mass reduction rate of the semiconductor nanoparticle complex in the range of 350° C. or higher and 550° C. or lower was 7%. Furthermore, from the ΔTG curve, two peaks were confirmed at around 310° C. and around 430° C.

In the present invention, the total mass reduction rate when the semiconductor nanoparticle complex was heated to 700° C. in the thermogravimetric analysis was regarded as the mass fraction of all ligands with respect to the semiconductor nanoparticle complex at room temperature (L).

Further, in the thermogravimetric analysis, the semiconductor nanoparticle complex was heated to 700° C., and the residual mass after the measurement was taken as the mass of the semiconductor nanoparticles. From this value, the mass fraction of the semiconductor nanoparticles with respect to the semiconductor nanoparticle complex at room temperature (Q) was confirmed.

With reference to the mass fraction of the semiconductor nanoparticles with respect to the semiconductor nanoparticle complex at room temperature (Q), PGMEA (SP value 9.41) was added to the semiconductor nanoparticle complex so that the mass fraction of the semiconductor nanoparticles was 5% by mass, and the dispersion state at that time was confirmed. In Table 2, the dispersion state was represented by yes when the nanoparticles were dispersed and by no when precipitation and turbidity were observed. Further, the amount of PGMEA added was adjusted so that the mass fraction of the semiconductor nanoparticles changed from 50% by mass to 10% by mass in 5% by mass, and the dispersion state was confirmed. The mass fractions at which precipitation and turbidity were no longer observed are shown in Table 2 as the mass fractions of the semiconductor nanoparticles. In the following Examples 2 to 21, the measurements were performed in the same manner, and the results are shown in Table 2.

Example 2

A semiconductor nanoparticle complex was obtained in the same manner as in Example 1, except that 0.5 g of dodecanethiol was used as the aliphatic thiol ligand and 4.0 g of PEG-SH was used as the polar ligand in the step of preparing the semiconductor nanoparticle complex.

Example 3

A semiconductor nanoparticle complex was obtained in the same manner as in Example 1, except that 1.0 g of dodecanethiol was used as the aliphatic thiol ligand, 1.5 g of N-acetyl-N-(2-mercaptoethyl)propanamide was used as the polar ligand, and 0.5 g of oleic acid was further added in the step of preparing the semiconductor nanoparticle complex.

Example 4

A semiconductor nanoparticle complex was obtained in the same manner as in Example 1, except that 0.5 g of dodecanethiol was used as the aliphatic thiol ligand, 4.0 g of triethylene glycol monomethyl ether thiol (TEG-SH) was used as the polar ligand, and 0.5 g of oleic acid was further added in the step of preparing the semiconductor nanoparticle complex.

Example 5

A semiconductor nanoparticle complex was obtained in the same manner as in Example 1, except that 0.5 g of octanethiol was used as the aliphatic thiol ligand and 4.0 g of N-acetyl-N-(2-mercaptoethyl)propanamide was used as the polar ligand in the step of preparing the semiconductor nanoparticle complex.

Example 6

A semiconductor nanoparticle complex was obtained in the same manner as in Example 1, except that 0.5 g of dodecanethiol was used as the aliphatic thiol ligand and 6.0 g of PEG-SH (molecular weight 600) was used as the polar ligand in the step of preparing the semiconductor nanoparticle complex.

Example 7

In the step of preparing a shell of semiconductor nanoparticles, a mixture of 40 mmol of zinc octanoate and 75 mL of octadecene was used as a Zn precursor solution. Further, a semiconductor nanoparticle complex was prepared in the same manner as in Example 1, except that 0.5 g of dodecanethiol was used as the aliphatic thiol ligand, 4.0 g of N-acetyl-N-(2-mercaptoethyl)propanamide was used as the polar ligand, and 0.5 g of capric acid (octanoic acid) was further added in the step of preparing the semiconductor nanoparticle complex.

Example 8

A semiconductor nanoparticle complex was obtained in the same manner as in Example 1, except that 0.5 g of dodecanethiol was used as the aliphatic thiol ligand and 4.0 g of methyl 3-mercaptopropionate (manufactured by Tokyo Kasei Kogyo Co., Ltd.) was used as the polar ligand in the step of preparing the semiconductor nanoparticle complex.

Example 9

A semiconductor nanoparticle complex was obtained in the same manner as in Example 1, except that 0.2 g of dodecanethiol was used as the aliphatic thiol ligand and 8.0 g of PEG-SH was used as the polar ligand in the step of preparing the semiconductor nanoparticle complex.

Example 10

A semiconductor nanoparticle complex was obtained in the same manner as in Example 1, except that 0.5 g of cyclopentanethiol was used as the aliphatic thiol ligand, 4.0 g of PEG-SH was used as the polar ligand, and 0.5 g of oleic acid was further added in the step of preparing the semiconductor nanoparticle complex.

Figure 6:
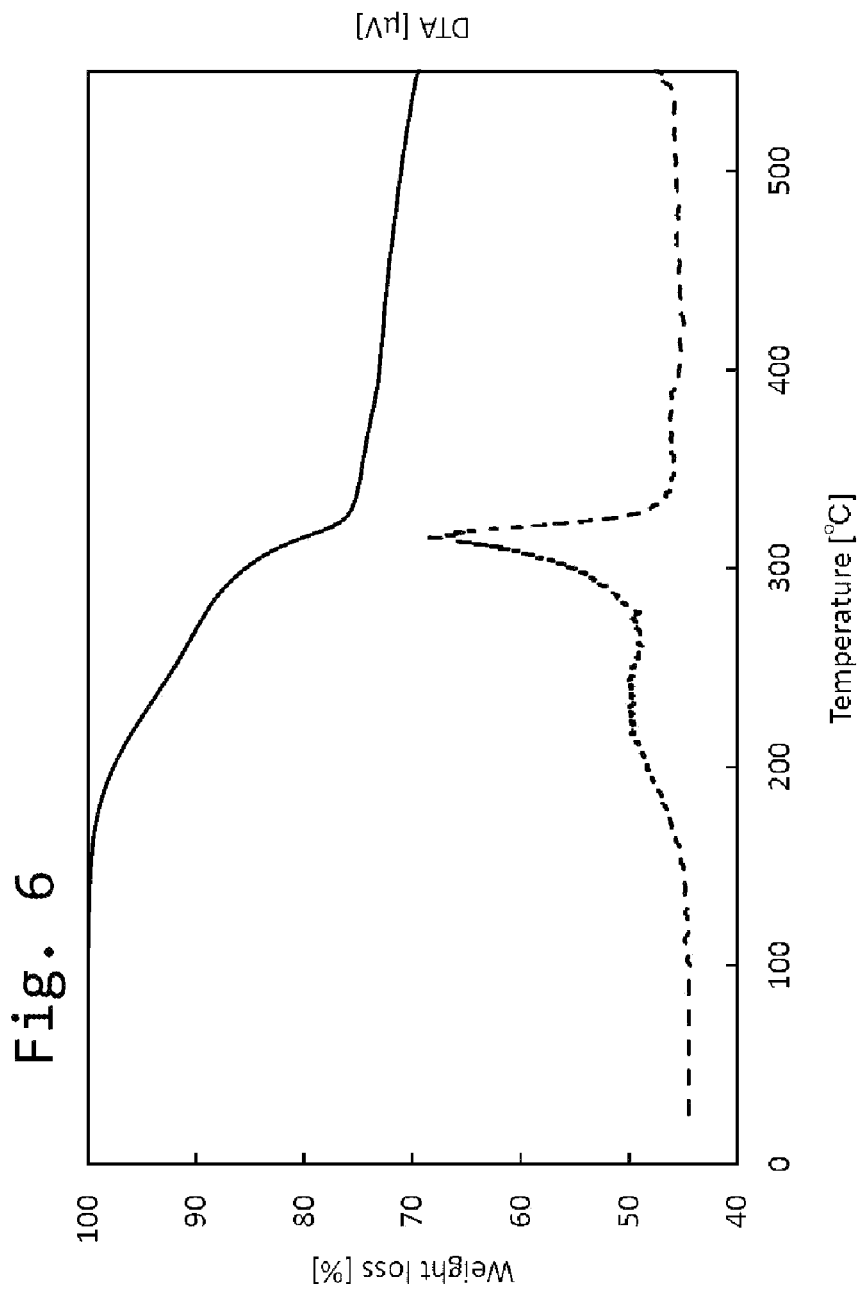
FIG. 6 shows the results of thermogravimetric analysis of the semiconductor nanoparticle complex of Example 10.

FIG. 6 is a graph showing the results of thermal analysis of the semiconductor nanoparticle complex of Example 10. The solid line is the TG curve, and the broken line is the ΔTG curve. In Example 10, cyclopentanethiol is used as the aliphatic ligand and PEG-SH is used as the polar ligand. In the ΔTG curve of Example 10, a peak due to detachment of cyclopentanethiol was observed near 230° C. and a peak due to PEG-SH was observed near 310° C. Thus, when the aliphatic ligand detaches faster than the polar ligand, the fluorescence quantum yield of the semiconductor nanoparticles decreases.

Example 11

A semiconductor nanoparticle complex was obtained in the same manner as in Example 1, except that 0.5 g of pentanethiol was used as the aliphatic thiol ligand, 4.0 g of PEG-SH was used as the polar ligand, and 0.5 g of oleic acid was further added in the step of preparing the semiconductor nanoparticle complex.

Example 12

In the step of preparing a shell of semiconductor nanoparticles, a mixture of 40 mmol of zinc acetate and 75 mL of octadecene was used as a Zn precursor solution. Further, a semiconductor nanoparticle complex was prepared in the same manner as in Example 1, except that 0.5 g of dodecanethiol was used as the aliphatic thiol ligand, 4.0 g of PEG-SH was used as the polar ligand, and 0.5 g of acetic acid was further added in the step of preparing the semiconductor nanoparticle complex.

Example 13

In the step of preparing the semiconductor nanoparticle complex, 2.0 g of dodecane thiol was added as the aliphatic thiol ligand, the polar ligand was changed to PEG-SH, and 1.0 g of oleic acid was further added. The mixture was stirred at 110° C. for 60 min under a nitrogen atmosphere and cooled to 25° C. A total of 5.0 mL of normal hexane was added to the reaction solution to prepare a dispersion liquid. A total of 50 mL of ethanol was added to the obtained dispersion liquid, and the mixture was centrifuged at 4000 G for 20 min. After centrifugation, the clear supernatant was removed and the precipitate was collected. This operation was repeated several times to obtain a purified semiconductor nanoparticle complex.

Example 14

A semiconductor nanoparticle complex was obtained in the same manner as in Example 1, except that 0.5 g of dodecanethiol was used as the aliphatic thiol ligand and 7.5 g of PEG-SH (molecular weight 750) was used as the polar ligand in the step of preparing the semiconductor nanoparticle complex.

Example 15

A semiconductor nanoparticle complex was obtained in the same manner as in Example 1, except that 0.5 g of dodecanethiol was used as the aliphatic thiol ligand and 10.0 g of PEG-SH (molecular weight 1000) was used as the polar ligand in the step of preparing the semiconductor nanoparticle complex.

Example 16

A total of 1.0 g of the semiconductor nanoparticle complex purified by the same method as in Example 1, 10 mL of isopropanol, and 4.0 g of PEG-SH were placed in a flask. The solution was stirred at 80° C. for 180 min under a nitrogen atmosphere and cooled to 25° C. A total of 50 mL of normal hexane was added to the reaction solution, and the mixture was centrifuged at 4000 G for 20 min. After centrifugation, the clear supernatant was removed and the precipitate was collected. A total of 5.0 mL of acetone was added to the precipitate to prepare a dispersion liquid. A total of 50 mL of normal hexane was added to the obtained dispersion liquid, followed by centrifugation at 4000 G for 20 min. After centrifugation, the clear supernatant was removed and the precipitate was collected. This operation was repeated several times to obtain a purified semiconductor nanoparticle complex.

Figure 7:
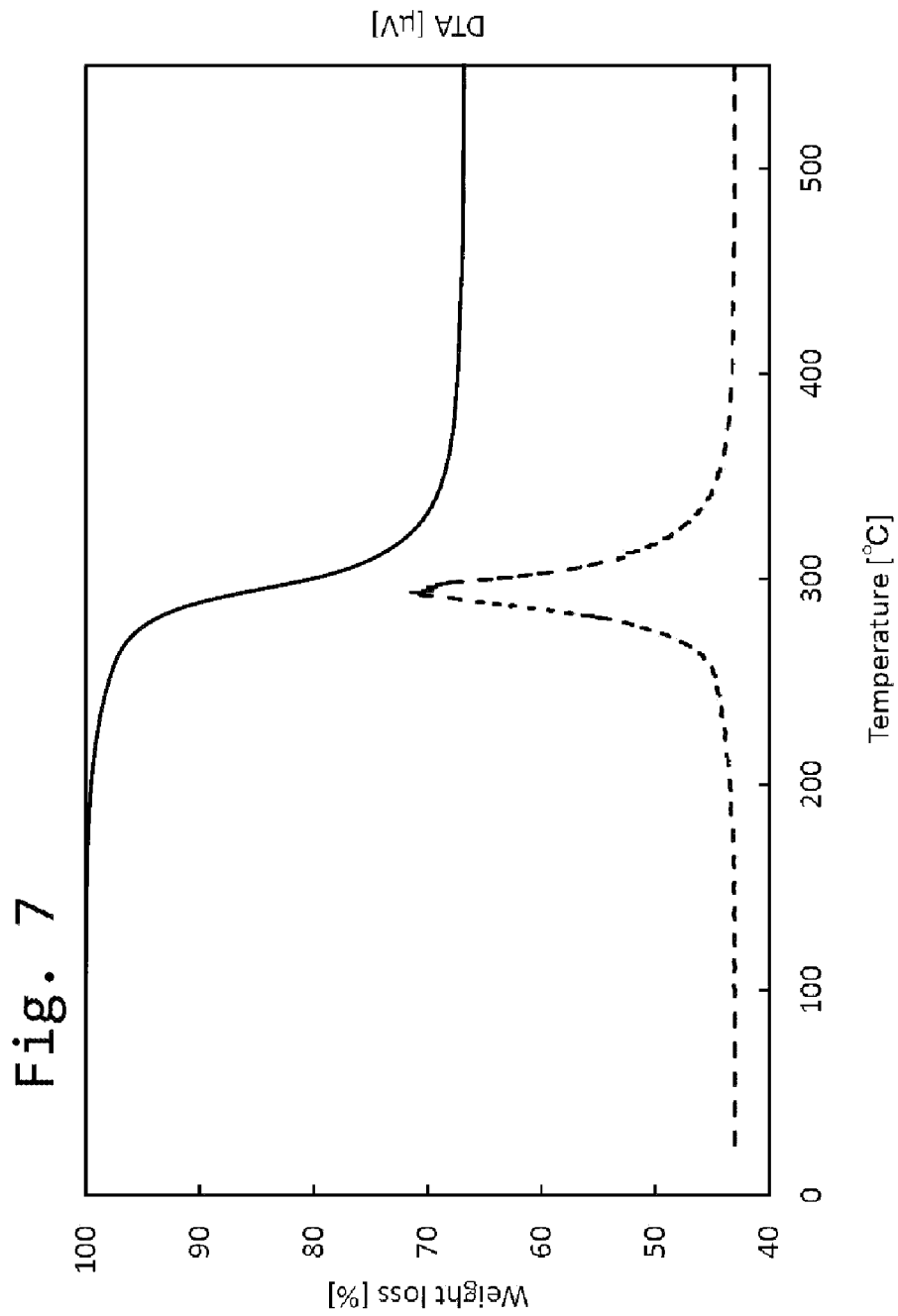
FIG. 7 shows the results of thermogravimetric analysis of the semiconductor nanoparticle complex of Example 16.

FIG. 7 is a graph showing the results of thermal analysis of the semiconductor nanoparticle complex of Example 16. The solid line is the TG curve, and the broken line is the ΔTG curve. In the ΔTG curve of the semiconductor nanoparticle complex of Example 16, a sharp single peak was observed near 300° C. When the type of ligand causing the peak was identified using the infrared absorption spectrum, it was found that the peak was caused by the polar ligand (PEG-SH). Meanwhile, when the ligand detached in the range of 350° C. or higher and 550° C. or lower was also identified using the infrared absorption spectrum, it was found that the ligand detached in the range of 350° C. or higher and 550° C. or lower was the aliphatic ligand. Focusing on the mass reduction rate in thermal analysis, the mass reduction rate in the range of 350° C. or higher and 550° C. or lower was 1%. Thus, when the mass reduction rate in the range of 350° C. or higher and 550° C. or lower is less than 2%, the fluorescence quantum yield of the semiconductor nanoparticle complex becomes low.

Example 17

A semiconductor nanoparticle complex was obtained in the same manner as in Example 1, except that 0.5 g of dodecanethiol was used as the aliphatic thiol ligand, 2.0 g of PEG-SH was used as the polar ligand, and 2.0 g of oleic acid was further added in the step of preparing the semiconductor nanoparticle complex.

Figure 8:
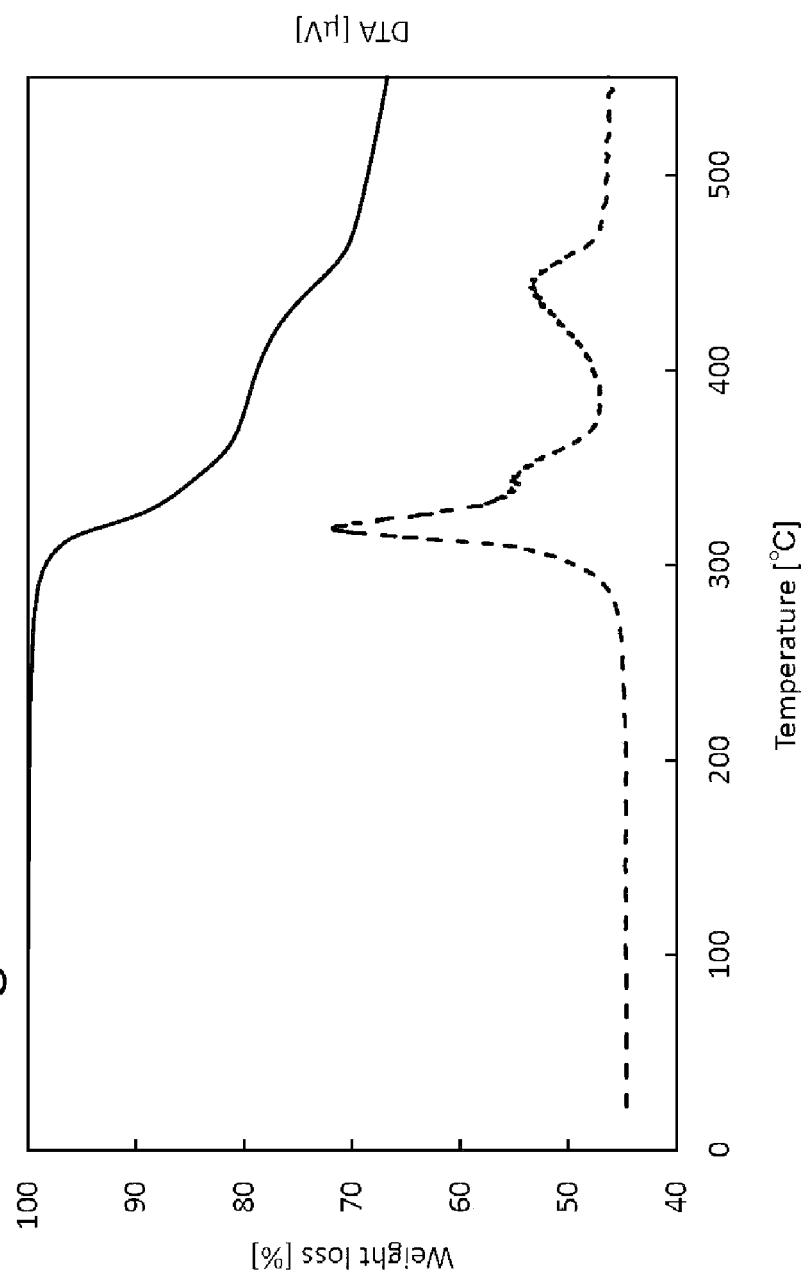
FIG. 8 shows the results of thermogravimetric analysis of the semiconductor nanoparticle complex of Example 17.

FIG. 8 is a graph showing the results of thermal analysis of the semiconductor nanoparticle complex of Example 17. The solid line is the TG curve, and the broken line is the ΔTG curve. Dodecanethiol and oleic acid are used as aliphatic ligands, and PEG-SH is used as a polar ligand. In the ΔTG curve of Example 17, a peak due to detachment of the polar ligand was observed near 310° C., and a peak due to detachment of the aliphatic ligand was observed near 440° C. Focusing on the mass reduction rate in thermal analysis, the mass reduction rate in the range of 350° C. or higher and 550° C. or lower was 17%. Thus, when the mass reduction rate in the range of 350° C. or higher and 550° C. or lower is 15% or more, the fluorescence quantum yield of the semiconductor nanoparticle complex becomes low.

Example 18

A semiconductor nanoparticle complex was obtained in the same manner as in Example 1, except that 0.5 g of dodecanethiol was used as the aliphatic thiol ligand, 2.0 g of N-acetyl-N-(2-mercaptoethyl)propanamide was used as the polar ligand, and 2.0 g of oleic acid was further added in the step of preparing the semiconductor nanoparticle complex.

Example 19

A semiconductor nanoparticle complex was obtained in the same manner as in Example 1, except that 4.0 g of dodecanethiol was used as the aliphatic thiol ligand and no polar ligand was added in the step of preparing the semiconductor nanoparticle complex.

Example 20

A semiconductor nanoparticle complex was obtained in the same manner as in Example 1, except that 4.0 g of oleic acid was added without adding an aliphatic thiol ligand or a polar ligand in the step of preparing the semiconductor nanoparticle complex.

Example 21

A semiconductor nanoparticle complex was obtained in the same manner as in Example 1, except that 4.0 g of PEG-SH was used as a polar ligand without adding an aliphatic thiol ligand in the step of preparing the semiconductor nanoparticle complex.

Table 1 shows the composition of the ligand of the obtained semiconductor nanoparticle complex, and Table 2 shows the emission characteristics, the results of thermal analysis, and the dispersion state in the dispersion medium. The semiconductor nanoparticle complex is preferably one that can be dispersed so that the mass fraction of the semiconductor nanoparticles is 25% by mass or more when dispersing in PGMEA.

The meanings of the abbreviations shown in Table 1 are as follows.
DDT: Dodecanethiol
Oct-SH: Octanethiol
OA: Oleic acid
OctA: Octanoic acid

TABLE 1

| | Ligand type | | | Ligand composition | | | |
|---|---|---|---|---|---|---|---|
| | Aliphatic ligand | Polar ligand | | Molecular weight of polar ligand | Polar ligand | Aliphatic ligand | Aliphatic ligand/ Polar ligand |
| Example 1 | DDT | OA | PEG-SH | 430 | 95 | 5 | 0.05 |
| Example 2 | DDT | OA | PEG-SH | 430 | 81 | 19 | 0.23 |
| Example 3 | DDT | OA | N-acetyl-N-(2-mercaptoethyl)propanamide | 175 | 50 | 50 | 1.00 |
| Example 4 | DDT | OA | TEG-SH (Triethylene glycol monomethylthiol) | 180 | 71 | 29 | 0.41 |
| Example 5 | Oct-SH | OA | N-acetyl-N-(2-mercaptoethyl)propanamide | 175 | 80 | 20 | 0.25 |
| Example 6 | DDT | OA | PEG-SH | 600 | 87 | 13 | 0.15 |
| Example 7 | DDT | OctA | N-acetyl-N-(2-mercaptoethyl)propanamide | 175 | 75 | 25 | 0.33 |
| Example 8 | DDT | OA | MPA-Me Methyl 3-mercaptopropionate | 120 | 82 | 18 | 0.22 |
| Example 9 | DDT | OA | PEG-SH | 430 | 94 | 6 | 0.06 |
| Example 10 | Cyclopentanethiol | OA | PEG-SH | 430 | 75 | 25 | 0.33 |
| Example 11 | Pentanethiol | OA | PEG-SH | 430 | 75 | 25 | 0.33 |
| Example 12 | DDT | Acetic acid | PEG-SH | 430 | 79 | 21 | 0.27 |
| Example 13 | DDT | OA | PEG-SH | 430 | 40 | 60 | 1.50 |
| Example 14 | DDT | OA | PEG-SH | 750 | 89 | 11 | 0.12 |
| Example 15 | DDT | OA | PEG-SH | 1000 | 92 | 8 | 0.09 |
| Example 16 | DDT | OA | PEG-SH | 430 | 97 | 3 | 0.02 |
| Example 17 | DDT | OA | PEG-SH | 430 | 51 | 49 | 0.90 |
| Example 18 | DDT | OA | N-acetyl-N-(2-mercaptoethyl)propanamide | 175 | 46 | 47 | 1.02 |
| Example 19 | DDT | — | — | — | 0 | 100 | — |
| Example 20 | — | OA | — | — | 0 | 100 | — |
| Example 21 | — | — | PEG-SH | 400 | 100 | 0 | 0 |

TABLE 2

| | Emission characteristics | | At room temperature | | | Thermal analysis | | | | | | | Dispersibility in PGMEA | |
|---|---|---|---|---|---|---|---|---|---|---|---|---|---|---|
| | Fluorescence quantum yield (%) | Full width at half maximum (nm) | Mass fraction (L) of all ligands (%) | Mass fraction (Q) of semiconductor nanoparticles (%) | L/Q | Mass reduction rate (X) (%) at room temperature to 700° C. | Mass reduction rate ($X_L$) (%) at room temperature to 350° C. | Mass reduction rate ($X_H$) (%) at 350° C. to 550° C. | Detachment at low temperature | $X_H/L$ | $X_L/L$ | $L_P/L$ | Dispersion state | Semiconductor nanoparticle mass fraction (% by mass) |
| Example 1 | 88 | 36 | 32 | 68 | 0.47 | 32 | 25 | 7 | Polar | 21.9 | 78.1 | 95 | yes | 35 |
| Example 2 | 92 | 37 | 30 | 70 | 0.43 | 30 | 22 | 8 | Polar | 26.7 | 73.3 | 81 | yes | 35 |
| Example 3 | 87 | 37 | 25 | 75 | 0.33 | 25 | 12 | 13 | Polar | 52.0 | 48.0 | 50 | yes | 35 |
| Example 4 | 90 | 36 | 24 | 76 | 0.32 | 24 | 13 | 11 | Polar | 45.0 | 55.0 | 71 | yes | 35 |
| Example 5 | 83 | 36 | 29 | 71 | 0.41 | 29 | 22 | 7 | Polar | 24.1 | 75.9 | 80 | yes | 35 |
| Example 6 | 85 | 38 | 37 | 63 | 0.59 | 37 | 23 | 14 | Polar | 37.8 | 62.2 | 87 | yes | 25 |
| Example 7 | 90 | 36 | 28 | 72 | 0.39 | 28 | 16 | 12 | Polar | 42.9 | 57.1 | 75 | yes | 35 |
| Example 8 | 88 | 37 | 25 | 75 | 0.33 | 25 | 18 | 7 | Polar | 28.3 | 71.7 | 82 | yes | 35 |
| Example 9 | 85 | 36 | 33 | 67 | 0.49 | 33 | 29 | 4 | Polar | 12.1 | 87.9 | 94 | yes | 35 |

TABLE 2-continued

| | Emission characteristics | | At room temperature | | | Thermal analysis | | | | | | | Dispersibility in PGMEA | |
|---|---|---|---|---|---|---|---|---|---|---|---|---|---|---|
| | Fluorescence quantum yield (%) | Full width at half maximum (nm) | Mass fraction (L) of all ligands (%) | Mass fraction (Q) of semiconductor nanoparticles (%) | L/Q | Mass reduction rate (X) (%) at room temperature to 700° C. | Mass reduction rate ($X_L$) (%) at room temperature to 350° C. | Mass reduction rate ($X_H$) (%) at 350° C. to 550° C. | Detachment at low temperature | $X_H/L$ | $X_L/L$ | $L_P/L$ | Dispersion state | Semiconductor nanoparticle mass fraction (% by mass) |
| Example 10 | 56 | 43 | 30 | 70 | 0.43 | 30 | 19 | 11 | Aliphatic | 36.7 | 63.3 | 75 | yes | 30 |
| Example 11 | 65 | 44 | 29 | 71 | 0.41 | 29 | 19 | 10 | Aliphatic | 34.5 | 65.5 | 75 | yes | 30 |
| Example 12 | 62 | 45 | 32 | 68 | 0.47 | 32 | 28 | 4 | Aliphatic | 12.5 | 87.5 | 79 | yes | 30 |
| Example 13 | 84 | 36 | 25 | 75 | 0.33 | 25 | 11 | 14 | Polar | 56.0 | 44.0 | 40 | no | — |
| Example 14 | 82 | 37 | 66 | 34 | 1.94 | 66 | 62 | 4 | Polar | 6.1 | 93.9 | 89 | yes | 20 |
| Example 15 | 83 | 38 | 73 | 27 | 2.70 | 73 | 70 | 3 | Polar | 4.1 | 95.9 | 92 | yes | 15 |
| Example 16 | 73 | 37 | 35 | 65 | 0.54 | 35 | 34 | 1 | Polar | 2.9 | 97.1 | 97 | yes | 25 |
| Example 17 | 82 | 37 | 28 | 72 | 0.39 | 28 | 11 | 17 | Polar | 60.7 | 39.3 | 51 | yes | 15 |
| Example 18 | 81 | 38 | 26 | 74 | 0.35 | 26 | 10 | 16 | Polar | 61.5 | 38.5 | 46 | yes | 15 |
| Example 19 | 79 | 36 | 25 | 75 | 0.43 | 25 | 11 | 14 | Aliphatic | 56.0 | 44.0 | 0 | no | — |
| Example 20 | 64 | 37 | 27 | 73 | 0.43 | 27 | 3 | 24 | Aliphatic | 88.9 | 11.1 | 0 | no | — |
| Example 21 | 74 | 37 | 35 | 65 | 0.54 | 35 | 34 | 1 | Polar | 2.9 | 97.1 | 100 | yes | 20 |

The invention claimed is:

1. A semiconductor nanoparticle complex in which two or more ligands including an aliphatic ligand and a polar ligand are coordinated to a surface of a semiconductor nanoparticle, wherein
the ligands are composed of an organic group and a coordinating group;
in the aliphatic ligand, the organic group is an aliphatic hydrocarbon group;
the polar ligand includes a hydrophilic functional group in the organic group;
a mass ratio of the aliphatic ligand to the polar ligand (aliphatic ligand/polar ligand) is 0.05 to 1.00;
a ratio ($\{(X_H)/L\} \times 100$) of a mass reduction rate of the semiconductor nanoparticle complex in a range of 350° C. or higher and 550° C. or lower in a thermogravimetric analysis ($X_H$) to a mass fraction of all ligands in the semiconductor nanoparticle complex at room temperature (L) is 10 or more and 55 or less.

2. A semiconductor nanoparticle complex in which two or more ligands including an aliphatic ligand and a polar ligand are coordinated to the surface of a semiconductor nanoparticle, wherein
the ligands are composed of an organic group and a coordinating group;
in the aliphatic ligand, the organic group is an aliphatic hydrocarbon group;
the polar ligand includes a hydrophilic functional group in the organic group;
a mass ratio of the aliphatic ligand to the polar ligand (aliphatic ligand/polar ligand) is 0.05 to 1.00;
a mass reduction rate of the semiconductor nanoparticle complex in a range of 350° C. or higher and 550° C. or lower in a thermogravimetric analysis ($X_H$) is 2% or more and 15% or less.

3. The semiconductor nanoparticle complex according to claim 1, wherein
when the semiconductor nanoparticle complex is heated, the polar ligand is detached from the surface of the semiconductor nanoparticles at a lower temperature than the aliphatic ligand.

4. The semiconductor nanoparticle complex according to claim 1, wherein
in the thermogravimetric analysis,
the relationship between
a ratio ($X_L/X$) of a mass reduction rate in the range from room temperature to 350° C. ($X_L$) to a mass reduction rate when the semiconductor nanoparticle complex was heated from room temperature to 700° C. (X), and
a ratio ($L_P/L$) of a mass fraction of a polar ligand in the semiconductor nanoparticle complex at room temperature ($L_P$) to a mass fraction of all ligands in the semiconductor nanoparticle complex at room temperature (L) is
($X_L/X$)<($L_P/L$).

5. The semiconductor nanoparticle complex according to claim 1, wherein
the semiconductor nanoparticle complex can be dispersed in a dispersion medium having an SP value of 9.0 to 15.0.

6. The semiconductor nanoparticle complex according to claim 5, wherein
the dispersion medium is one selected from the group consisting of acetone, PGMEA, PGME, IPA, ethanol, and methanol, or a mixed dispersion medium of two or more thereof.

7. The semiconductor nanoparticle complex according to claim 1, wherein
at least a part of reduction in mass at 350° C. or higher is attributed to detachment of the aliphatic ligand.

8. The semiconductor nanoparticle complex according to claim 1, wherein
the aliphatic ligand has one coordinating group and at least one or more aliphatic hydrocarbon groups bonded thereto.

9. The semiconductor nanoparticle complex according to claim 1, wherein
the molecular weight of the polar ligand is 50 or more and 600 or less.

10. The semiconductor nanoparticle complex according to claim 1, wherein
the coordinating group of the aliphatic ligand is selected from the group consisting of an amino group, a carboxyl group, a mercapto group, a phosphine group, and a phosphine oxide group.

11. The semiconductor nanoparticle complex according to claim 1, wherein
the organic group of the polar ligand has at least one of a hydroxyl group, a carboxyl group, a carbonyl group, a mercapto group, an amino group, an ether bond, an ester bond, and a siloxane bond.

12. The semiconductor nanoparticle complex according to claim 1, wherein
the coordinating group of the polar ligand is a mercapto group.

13. The semiconductor nanoparticle complex according to claim 1, wherein
the mass ratio of the ligand to the semiconductor nanoparticle (ligand/semiconductor nanoparticle) is 0.1 to 0.7.

14. The semiconductor nanoparticle complex according to claim 5, that can be dispersed in the dispersion medium at a mass fraction of the semiconductor nanoparticles of 25% by mass or more.

15. The semiconductor nanoparticle complex according to claim 1, wherein
the semiconductor nanoparticle includes Zn on the surface of the semiconductor nanoparticle.

16. The semiconductor nanoparticle complex according to claim 1, wherein
a fluorescence quantum yield of the semiconductor nanoparticle complex is 80% or more.

17. The semiconductor nanoparticle complex according to claim 1, wherein
a full width at half maximum of emission spectrum of the semiconductor nanoparticle complex is 40 nm or less.

18. The semiconductor nanoparticle complex according to claim 1, wherein
the semiconductor nanoparticle includes In and P.

* * * * *